US008447597B2

(12) United States Patent
Ide

(10) Patent No.: US 8,447,597 B2
(45) Date of Patent: May 21, 2013

(54) AUDIO ENCODING DEVICE, AUDIO DECODING DEVICE, AUDIO ENCODING METHOD, AND AUDIO DECODING METHOD

(75) Inventor: Hiroyasu Ide, Fussa (JP)

(73) Assignee: Casio Computer Co., Ltd., Tokyo (JP)

( * ) Notice: Subject to any disclaimer, the term of this patent is extended or adjusted under 35 U.S.C. 154(b) by 1369 days.

(21) Appl. No.: 11/906,312

(22) Filed: Oct. 1, 2007

(65) Prior Publication Data

US 2008/0082321 A1 Apr. 3, 2008

(30) Foreign Application Priority Data

Oct. 2, 2006 (JP) ................................ 2006-270993

(51) Int. Cl.
*G10L 19/02* (2006.01)
*G10L 19/00* (2006.01)
*G10L 15/14* (2006.01)
*G10L 21/00* (2006.01)
*G10L 19/12* (2006.01)

(52) U.S. Cl.
USPC ........ 704/229; 704/230; 704/203; 704/256.8; 704/201; 704/212; 704/221; 704/222; 704/223

(58) Field of Classification Search .................. 704/203, 704/229, 230, 256.8, E19.015, 201, 212, 704/221, 222, 223; 711/111
See application file for complete search history.

(56) References Cited

U.S. PATENT DOCUMENTS 4,797,902 A * 1/1989 Nishiguchi et al. ........... 375/245
5,046,107 A * 9/1991 Iwamatsu ..................... 381/107
5,222,189 A * 6/1993 Fielder .......................... 704/229
5,303,374 A * 4/1994 Mitsuhashi et al. .......... 704/212
5,317,672 A * 5/1994 Crossman et al. ............ 704/229
6,393,203 B1 * 5/2002 Ueno et al. .................... 386/327
6,732,071 B2 * 5/2004 Lopez-Estrada et al. ..... 704/219
7,269,554 B2 * 9/2007 Lopez-Estrada et al. ..... 704/229
7,328,160 B2 * 2/2008 Nishio et al. .................. 704/500
7,349,842 B2 * 3/2008 Youn ............................. 704/229

(Continued)

FOREIGN PATENT DOCUMENTS

JP 07-046137 A 2/1995

OTHER PUBLICATIONS

J. Herre, "Temporal noise shaping, quantization and coding methods in perceptual audio coding: a tutorial introduction," in AES17th International Conference, pp. 312-325, 1999.*
T. Painter and A. Spanias. Perceptual coding of digital audio. Proc. IEEE, 88(4), Apr. 2000.*
International Search Report and Written Opinion of the International Searching Authority, Dated Dec. 14, 2007, for PCT/JP2007/068733, 10 sheets.
Japanese Industrial Standard No. JISX4323-1996 (ISO-IEC 11172-3:1993), Encoding Motion Video signals and Associates Sound Signals for Digital Recording Media at 1.5 Mbit/s-Part 3: sound p. 96 [on-line] URL: http:\www.jisc.go.jp/app/pager?id=22028.

*Primary Examiner* — Edgar Guerra-Erazo
(74) *Attorney, Agent, or Firm* — Holtz, Holtz, Goodman & Chick, P.C.

(57) ABSTRACT

In an encoding process, a CPU transforms an audio signal from the real-time domain to the frequency domain, and transforms the signal into spectra consisting of MDCT coefficients. The CPU separates the audio signal into several frequency bands, and performs bit shifting in each band such that the MDCT coefficients can be expressed with pre-configured numbers of bits. The CPU re-quantizes the MDCT coefficients at a precision differing for each band, and transmits the values acquired thereby and shift bit numbers as encoded data. Meanwhile, in a decoding process, a CPU receives encoded data and inverse re-quantizes and inverse bit shifts the data, thereby restoring the MDCT coefficients. Furthermore, the CPU transforms the data from frequency domain to the real-time domain by using the inverse MDCT, and restores and outputs the audio signal.

12 Claims, 14 Drawing Sheets

U.S. PATENT DOCUMENTS

| | | | | |
|---|---|---|---|---|
| 7,548,851 | B1 * | 6/2009 | Lau et al. | 704/201 |
| 2002/0013703 | A1 * | 1/2002 | Matsumoto et al. | 704/234 |
| 2004/0002859 | A1 * | 1/2004 | Liu et al. | 704/229 |
| 2004/0143431 | A1 * | 7/2004 | Hsu | 704/205 |
| 2004/0196913 | A1 * | 10/2004 | Chakravarthy et al. | 375/254 |
| 2004/0225495 | A1 * | 11/2004 | Makino | 704/229 |
| 2005/0108003 | A1 * | 5/2005 | Kikuchi et al. | 704/203 |
| 2006/0212290 | A1 | 9/2006 | Ide | |
| 2008/0015855 | A1 * | 1/2008 | Suzuki | 704/230 |

* cited by examiner

AUDIO ENCODING DEVICE, AUDIO DECODING DEVICE, AUDIO ENCODING METHOD, AND AUDIO DECODING METHOD

BACKGROUND OF THE INVENTION

1. Field of the Invention

The present invention relates to an audio encoding device, an audio decoding device, an audio encoding method, and an audio decoding method that can encode and decode audio signals with high quality and at high speed.

2. Description of the Related Art

In audio communication conducted under conditions wherein the communication volume is limited, it is necessary to innovatively use audio signal encoding and decoding processing so as to communicate with the maximum audio quality achievable with a minimum of data.

One such direction of innovation involves effectively utilizing the characteristics of human hearing.

As one audio encoding method taking into consideration the characteristics of hearing, as described in for example in Japanese Unexamined Japanese Patent Application KOKAI Publication No. H7-46137 and JIS Std. No. JISX4323, methods are known wherein, after converting an audio signal into spectra, the spectra are separated into a plurality of sub-bands, while taking into consideration a critical region derived from the characteristics of hearing.

As a result, signal values, masking levels, noise, etc., for each of the above-described sub-bands are taken into consideration, and after calculating the number of bits necessary for encoding, encoding is conducted.

However, in such methods, the procedure for calculating the number of bits necessary for encoding is complex and requires many computational steps. In addition, there is also a problem in that calculating a masking level, for example, is non-trivial.

Therefore, the load on an encoding device executing computational processing becomes large, and there is a risk that the processing speed will slow. For example, in devices such as mobile phones, there is the possibility that bi-directional communication in real-time will become difficult. In order to avoid this, costs are unavoidably incurred because of the necessity of incorporating particularly high-performance calculating apparatus into encoding devices and the like.

Accordingly, there is a need for audio encoding devices and decoding devices that, while taking into consideration hearing characteristics, can communicate in real-time without any practical audio quality problems, using calculating apparatus wherein typical performance is sufficient.

SUMMARY OF THE INVENTION

The objective of the present invention, being devised in light of the above-described circumstances, is to provide an audio encoding device, an audio decoding device, an audio encoding method, and an audio decoding method that can encode and decode audio signals with high quality and at high speed.

In order to achieve the above-described object, an audio encoding device in accordance with a first aspect of the present invention comprises the following:

a storage unit which stores an information indicating the frequency width of each band of audio data which is comprised of a plurality of first frequency bands, in association with a predetermined number of bits respectively;

a discrete transformation unit that acquires the audio data, discretely transforms it from the time domain to the frequency domain, and calculates quantized values indicating the audio strength for each frequency;

a maximum value calculation unit that separates the discretely transformed frequency domain audio data into a plurality of first frequency bands having the frequency widths, and calculates the maximum value of the calculated quantized values for each of the separated first frequency bands;

a determining unit that, for each of the first frequency bands, determines whether or not the number of bits necessary for expressing the maximum value calculated by the maximum value calculation unit exceeds the set number of bits stored in the storage unit;

an adjustment unit that, for each of the first frequency bands, in the case where it is determined by the determining unit that the necessary number of bits exceeds the set number of bits, acquires for a divisor, this divisor (a value expressed as a power of 2) being the smallest value wherein the necessary number of bits does not exceed the set number of bits when the maximum value is divided thereby, and respectively divides the quantized values within the first frequency band by this divisor, thereby adjusting the audio strength;

a re-quantizing unit that, for each of a plurality of second frequency bands having a set band width, re-quantizes the quantized values calculated by the discrete transformation unit, or alternatively, the quantized values adjusted by the adjustment unit, at a precision decided in advance; and an encoding unit that encodes, associates, and outputs the divisors calculated by the adjustment unit and the quantized values calculated by the re-quantizing unit.

In order to achieve the above-described object, an audio decoding device in accordance with a second aspect of the present invention comprises the following:

a receiver that receives encoded data, the data being encoded by a set encoding method and consisting of quantized audio data, the signal strength thereof expressed by quantized values adjusted for each of a plurality of first frequency bands, and numerical parameters, expressed as powers of 2, associated with each band of a plurality of set second frequency bands configured for the audio data;

a decoding unit that, by using a decoding method corresponding to the set encoding method, decodes the encoded data into the quantized audio data and the numerical parameters;

a strength restoration unit that, for each of the plurality of second frequency bands, multiplies the decoded quantized values within the band by the decoded numerical parameter associated with that band, thereby restoring the audio strength of the audio data; and a discrete inverse transformation unit that, for each of the plurality of first frequency bands, transforms the strength-restored audio data from the frequency domain to the time domain.

As a result of the present invention, it becomes possible to quickly and responsively encode/decode an audio signal while maintaining high sound quality.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENTS (Embodiment 1)

Figure 1:
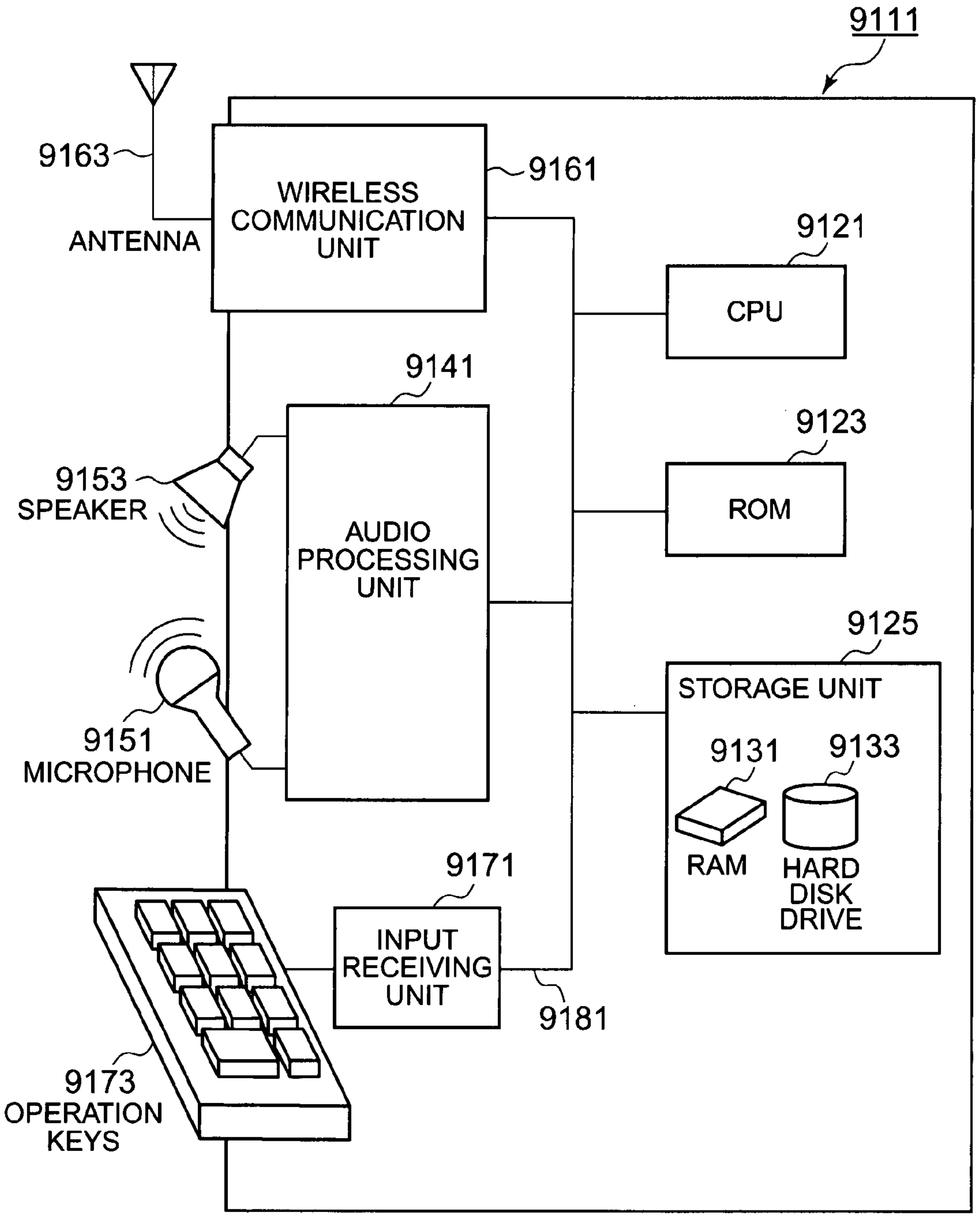
FIG. 1 shows the configuration of an audio encoding/decoding device in accordance with embodiments of the present invention.

FIG. 1 shows an audio encoding/decoding device 9111 in accordance with the resent embodiment. A mobile phone, for example, can be used for the device. The audio encoding/decoding device 9111 functions as an audio data encoding device, and also functions as an encoded audio data decoding device.

The audio encoding device 9111 comprises a CPU (Central Processing Unit) 9121, ROM (Read Only Memory) 9123, a storage unit 9125, an audio processing unit 9141, a wireless communication unit 9161, and an input receiving unit 9171. These are mutually connected by a system bus 9181. The system bus 9181 is a forwarding pathway for forwarding instructions and data.

In the ROM 9123 is stored a program for audio encoding/decoding using processing to be hereinafter described.

The storage unit 9125 comprises RAM (Random Access Memory) 9131 and a hard disk drive 9133. The storage unit 9125 stores digital audio signals, MDCT coefficients, shift bit numbers, code, as well as the respective characteristic values of small segments, medium segments, and large segments, to be hereinafter described.

The audio encoding/decoding device 9111 furthermore comprises a microphone 9151, a speaker 9153, an antenna 9163, and operation keys 9173.

The microphone 9151 picks up audio (vocal sounds, etc.) of the user on the sending side and inputs it into the audio processing unit 9141. The speaker 9153 outputs audio decoded by the audio processing unit 9141. The antenna 9163 sends to device of the other party in the communication a wireless signal input from the wireless communication unit 9161, and also receives a wireless signal transmitted from the other party's terminal and inputs it into the wireless communication unit 9161. The operation keys 9173 are used, for example, to receive from the user instruction inputs for changing the initial configuration value of an audio signal band's boundary frequency, and instruction inputs for specifying the other party.

The audio processing unit 9141, the wireless communication unit 9161, and the input receiving unit 9171 execute various processing as a result of controls from the CPU 9121.

Audio input into the microphone 9151 is converted into a digital audio signal by an A/D converter (not shown in the drawings) inside the audio processing unit 9141, using, for example, 16 KHz sampling and 16-bit quantization.

The acquired digital audio signal is time-divided into parts (frames) for compression processing, and subsequently sent to the storage unit 9125 by the audio processing unit 9141.

As described hereinafter, the signal of one frame is stored as a segment in the storage unit 9125, transformed from the real-time domain to the frequency domain by the CPU 9121, transmitted to the wireless communication unit 9161, and wirelessly transmitted by the antenna 9163.

For example, when a frame signal stored in the storage unit 9125 is transmitted to the wireless communication unit 9161 after being processed as described hereinafter by the CPU 9121, this frame signal data is deleted from the storage unit 9125. Also, the next frame signal from the audio processing unit 9141 is stored in the storage unit 9125, and the CPU 9121 repeats this processing sequence.

In this way, by continuously inputting an audio signal, the CPU 9121 progressively processes in successive frame parts.

As a result of this chain of processes, it becomes possible to process a signal in real-time.

Hereinafter, for the sake of simplicity in understanding, the present invention will be described assuming that audio spanning only one frame's worth of time is input into the microphone 9151.

For example, one frame, being an audio signal consisting of M signal values, is input into the microphone 9151, transformed into digital signals $x_0, \ldots, x_{M-1}$ by the audio processing unit 9141, and stored in the storage unit 9125. The CPU 9121, following the program stored in advance in the ROM 9123, conducts the following processing.

That is to say, the CPU 9121 loads the signals $x_0, \ldots, x_{M-1}$ stored in the storage unit 9125 into a general-purpose register (not shown in the drawings) of the CPU 9121. The real-time domain signals $x_0, \ldots, x_{M-1}$ are respectively transformed into frequency domain signals $X_0, \ldots, X_{M/2-1}$, and stored in the general-purpose register. The transformation method may be any arbitrary method that transforms real-time domain signals into frequency domain signals. However, implementing the MDCT (Modified Discrete Cosine Transform) is ideal, as it eases treatment of the signals since imaginary parts of the post-transformation numerical values are not generated.

These M real-time domain signal values correspond to M/2 frequency coefficient values in the above-described frequency domain. This is because the MDCT was used for the frequency transformation. In other methods, the ratio between the real-time domain data values and the frequency domain data values is not limited to 2:1. In these cases, the number appended to the final value of the frequency coefficients may be appropriately substituted in the following description.

Figures 2A, 2B, 2C, 2D:
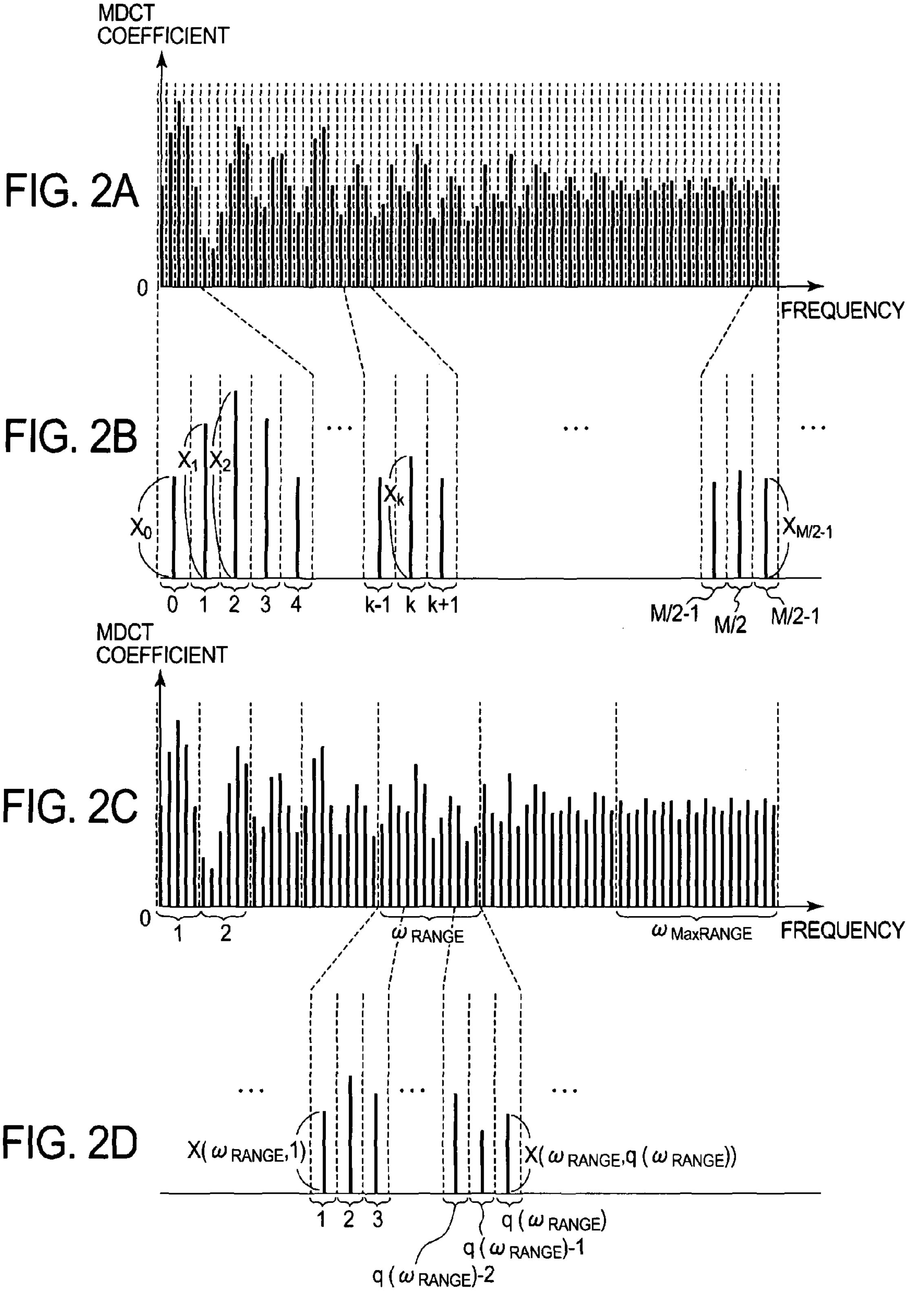
FIG. 2A shows the relationship between the MDCT coefficients and the frequencies.
FIG. 2B is an enlarged view of a portion of FIG. 2A.
FIG. 2C is a diagram for explaining the medium-segment bands.
FIG. 2D is an enlarged view of a portion of FIG. 2C.

FIG. 2A schematically illustrates the relationship between the MDCT coefficients generated in this way and the frequencies. FIG. 2B is an enlargement of a portion of FIG. 2A. Since the MDCT is one type of discrete frequency transformation, one signal value becomes allocated to each of the M/2 small-segment bands dividing the frequency bands. As shown in the figure, counting from the low-frequency side, a number k is assigned to the k+1 small-segment band, and a signal value $X_k$ is allocated thereto (wherein $0=k=M/2-1$). This signal value $X_k$ is called MDCT coefficient.

The MDCT is conducted once for a single time segment having a finite time length. Individual time segments are called MDCT blocks. In addition, the number of signal values contained in one MDCT block is called the MDCT order. A value of, for example, 512 is ideal as the MDCT order.

Since the frame is the part for audio compression process, the time length of an MDCT block must not exceed the time length of one frame. One frame may contain a plurality of MDCT blocks. For example, one frame containing from three to four MDCT blocks is ideal.

However, at this point, for the sake of simplicity in understanding the invention, one frame and one MDCT block will be taken to have a 1-to-1 correspondence. In other words, one frame will simply correspond to one MDCT block. In the present embodiment, the MDCT order is M.

From FIG. 2A onward, all MDCT coefficients are illustrated as being positive values, but it should be appreciated that this is only for the sake of simplicity in understanding the present invention. Actual MDCT coefficients can also take negative values. The figures relating to MDCT coefficients are ultimately only schematic diagrams for the sake of explanation.

For each of the MDCT coefficients $X_k(0=k=M/2-1)$ stored in the general-purpose register, the CPU 9121 re-appends reference numbers in order to differentiate the MDCT coefficients. Specifically, the CPU 9121 re-differentiates each MDCT coefficient with two reference numbers in the following way.

First, as shown in FIG. 2C, the entire frequency domain is separated into $\omega_{MaxRANGE}$ medium-segment bands, and each band is differentiated by appending differentiation numbers $1, 2, \ldots, \omega_{MaxRANGE}$ from the low-frequency thereto.

The CPU 9121 separates the frequency domain such that the logarithms of the central frequencies in each medium-segment band linearly depend on the differentiation numbers. As a result of this separation, the farther to the high-frequency side a medium-segment band is, the wider is its band width. This is schematically illustrated in FIG. 2C.

The reason for conducting separation based on logarithms in this way is because the sensitivity of human hearing with regards to frequency differences becomes logarithmically weaker as the frequency becomes higher. This being the case, in order to transmit the highest sound quality as perceived by humans that is possible given a limited communication volume, it is preferable to process audio to finely separate audio signals with low-frequency components to which human hearing is sensitive, and process audio to broadly separate audio signals with high-frequency components. As a result, it is possible to reduce the overall sending/receiving information volume.

For example, in the case where the audio processing unit 9141 transforms audio input into the microphone 9151 into a digital signal at a sampling frequency of 16 kHz, it is ideal to provide 11 medium-segment bands, the medium-segment bands having respective boundaries of 187.5 Hz, 437.5 Hz, 687.5 Hz, 937.5 Hz, 1312.5 Hz, 1687.5 Hz, 2312.5 Hz, 3250 Hz, 4625 Hz, and 6500 Hz.

Next, the CPU 9121 decides which number medium-segment band, counting from the low-frequency side, each MDCT coefficient belongs to. In a medium-segment band with the appended number $\omega_{RANGE}$ (wherein $1=\omega_{RANGE}=\omega_{MaxRANGE}$), $q(\omega_{RANGE})$ MDCT coefficients are included.

In so doing, all of the MDCT coefficients are differentiated by (1) the number $\omega_{RANGE}$ indicating which medium-segment band they belong to, and (2) the number q showing the ordinal position of a coefficient, counting from the low-frequency side. Hereinafter, as shown in FIG. 2D, respective MDCT coefficients will be expressed as $X(\omega_{RANGE}, 1), \ldots, X(\omega_{RANGE}, q(\omega_{RANGE}))$.

The CPU 9121 stores the acquired MDCT coefficients $X(\omega_{RANGE}, 1) \ldots X(\omega_{RANGE}, q(\omega_{RANGE}))$ in the storage unit 9125.

(Bit Shift Calculation Process)

Figure 3:
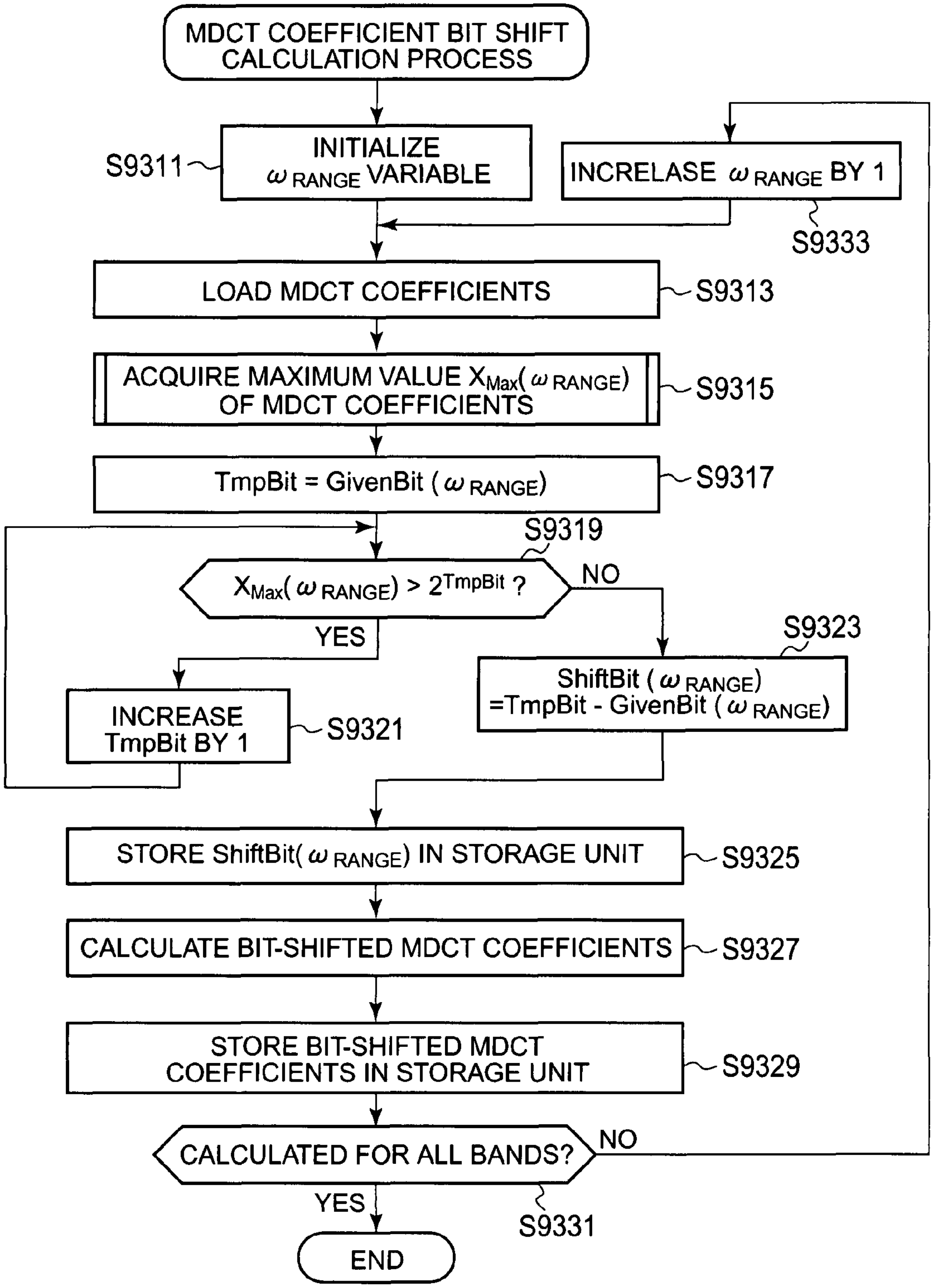
FIG. 3 is a flowchart showing bit shift calculation process of the MDCT coefficients.

As shown in the flowchart in FIG. 3, the CPU 9121 subsequently acquires for the maximum value of the MDCT coefficients, decides a number of bits to shift, bit-shifts, and re-calculates the MDCT coefficients using only the decided number of bits. Furthermore, for the sake of simplicity in understanding, a schematic example of MDCT coefficients are shown in FIG. 4.

More specifically, the CPU 9121 stores the variable used to differentiate medium-segment bands, $\omega_{RANGE}$, in an internal counter register (not shown in the drawings).

The CPU 9121 sets $\omega_{RANGE}$ to an initial value of 1 (step S9311). The CPU 9121 loads the MDCT coefficients $X(\omega_{RANGE}, 1), \ldots, X(\omega_{RANGE}, q(\omega_{RANGE}))$ from the storage unit 9125 into the general-purpose register (step S9313). Next, the CPU 9121 searches for the largest coefficient among the loaded MDCT coefficients (step S9315). In other words, in the medium-segment band with number $\omega_{RANGE}$ counting from the low-frequency side, the maximum value of the MDCT coefficients therein is acquired. This maximum value shall be expressed as $X_{MAX}(\omega_{RANGE})$.

Figure 4A:
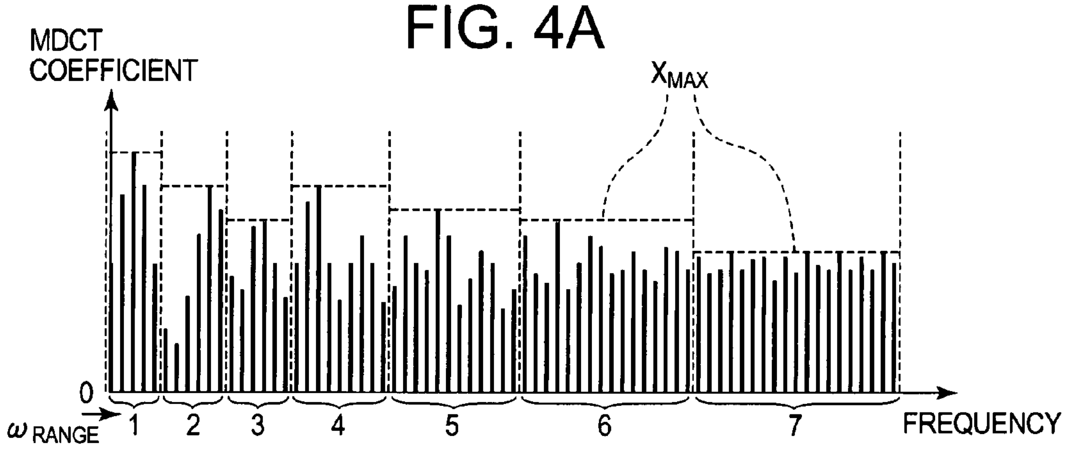
FIG. 4A shows an audio signal separated into medium-segment bands.

In the case FIG. 4A for example, the entire frequency domain is separated into seven medium-segment bands, and the maximum values $X_{MAX}(1)$ to $X_{MAX}(7)$ of the MDCT coefficients for each band are the values shown by the horizontal dotted lines.

In the program stored in the ROM 9123, for each medium-segment band, pre-defined numbers of bits used to express MDCT coefficients are configured. In other words, in the ROM 9123, information specifying the number of bits for each medium-segment band is stored in advance. This information may also be stored in the hard disk drive 9133.

The pre-configured numbers of bits for the medium-segment bands differentiated by the number $\omega_{RANGE}$ are expressed as $GivenBit(\omega_{RANGE})$.

$GivenBit(\omega_{RANGE})$ is configured to be a large value to the extent that the central frequency in each medium-segment band is small. To put it differently, its value is configured to be as small as ($\omega_{RANGE}$ is large. This is because, typically, the sensitivity of human hearing becomes weaker with high frequencies. In other words, in order to compress audio signal information volume as much as possible without lowering sound quality, although it is better to raise the precision of MDCT coefficients in the low-frequency domain where humans are sensitive to sound volume changes, degradation is low when the relative precision of MDCT coefficients is lowered in the high frequency-domain where humans are less sensitive.

Figure 4B:
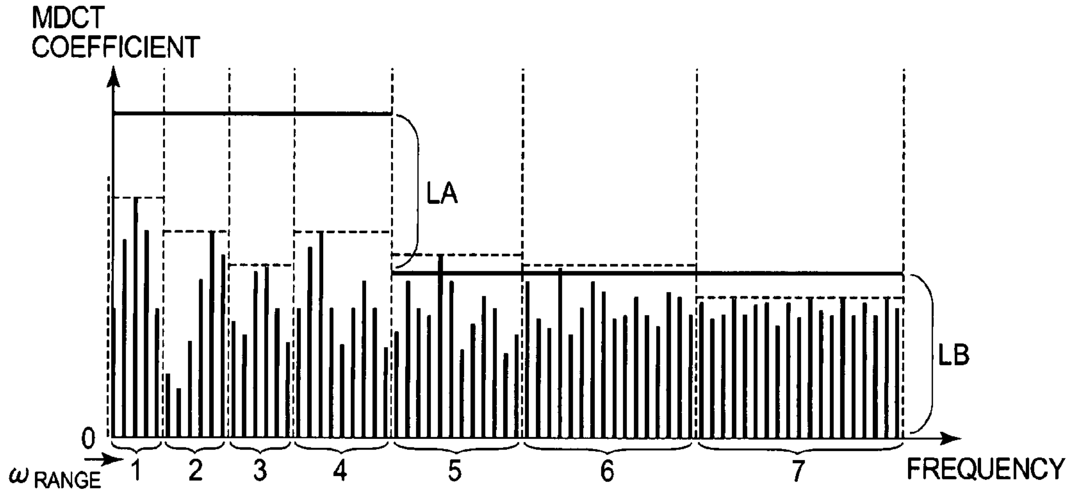
FIG. 4B is a diagram for explaining the number of bits allocated to each medium-segment band.

For example, as shown by the bold horizontal lines in FIG. 4B, for 5th to 7th medium-segment bands on the high-frequency side, the allocated number of bits is one less than the allocated number of bits for 1st to 4th medium-segment bands on the low-frequency side.

Furthermore, reducing the allocated number of bits by one means that the expressible range of numerical values has been halved. This corresponds to the fact that, in the case of FIG. 4B, the length LA and the length LB are equal. If the number of bits is increased by 1, 2, . . . etc., the range of expressible numerical values increases by 1st power of 2, 2nd power of 2, . . . etc.

The CPU 9121 stores a temporary variable TmpBit in a counter register different from the counter register wherein $\omega_{RANGE}$ is stored. As an initial value, the CPU 9121 sets TmpBit=GivenBit($\omega_{RANGE}$) (step S9317).

The variable TmpBit is used to determine whether or not $X_{MAX}(\omega_{RANGE})$, the maximum value of the MDCT coefficients in the medium-segment band with number $\omega_{RANGE}$, is expressible with GivenBit($\omega_{RANGE}$), the number of bits preconfigured for that medium-segment band. In the case where $X_{MAX}(\omega_{RANGE})$ is not expressible, TmpBit is used to determine how many bits are needed to make $X_{MAX}(\omega_{RANGE})$ expressible.

Specifically, the CPU 9121 determines whether or not $X_{MAX}(\omega_{RANGE})$ is larger than $2^{TmpBit}$ (step S9319). A power of 2 is used to conduct a comparison between binary umbers.

Strictly speaking, one bit is also necessary for expressing the sign of the MDCT coefficients. However, this fact is not related to the essential features of the present invention. For the sake of simplicity in understanding the present invention, in the following description it is assumed that the MDCT coefficients do not become negative.

If $X_{MAX}(\omega_{RANGE})$ is larger than $2^{TmpBit}$ (step S9319; YES), $X_{MAX}(\omega_{RANGE})$ cannot be expressed with a TmpBit number of bits, and therefore TmpBit is increased by 1 (step S9321). In this case, the process returns to step S9319.

Also, until $X_{MAX}(\omega_{RANGE})$ becomes expressible with a TmpBit number of bits (step S9319; NO), TmpBit is increased by 1 per iteration.

In the case where $X_{MAX}(\omega_{RANGE})$ is not more than $2^{TmpBit}$ (step S9319; NO), the CPU 9121, by subtracting GivenBit ($\omega_{RANGE}$) from TmpBit, calculates ShiftBit($\omega_{RANGE}$) (step S9323). ShiftBit($\omega_{RANGE}$) is the number of bits which can be contracted while still expressing all the MDCT coefficients of the medium-segment band with number $\omega_{RANGE}$.

In the case of FIG. 4B for example, for each band in $\omega_{RANGE}$=1 to 4 and $\omega_{RANGE}$=7, the maximum value of the MDCT coefficients is smaller than the maximum value that can be expressed with the set number of bits GivenBit($\omega_{RANGE}$). In other words, in these bands, since the MDCT coefficients can be expressed with a GivenBit($\omega_{RANGE}$) number of bits, the process reaches step S9323 without going through step S9321. Since the value of TmpBit is still the initial value GivenBit($\omega_{RANGE}$) set in step S9317, ShiftBit($\omega_{RANGE}$)=0 becomes true in step S9323. In other words, the number of bits for MDCT coefficients is not contracted.

On the other hand, for each of the bands with $\omega_{RANGE}$=5 and 6 in FIG. 4B, the maximum value of the MDCT coefficients is larger than the maximum value that can be expressed with the set number of bits GivenBit($\omega_{RANGE}$). Consequently, the determination result in the first iteration of step S9319 becomes YES, and the process proceeds to step S9321. In the case of the present figure, if TmpBit is increased by 1 in step S9321, all of the MDCT coefficients in these bands can be expressed. Consequently, the determination result in the second iteration of step S9319 becomes NO, and the process proceeds to step S9323. Since TmpBit has been increased over the initial value by 1 only, ShiftBit($\omega_{RANGE}$)=1 becomes true.

The CPU 9121 stores ShiftBit($\omega_{RANGE}$) acquired in this way in the storage unit 9125 (step S9325). These ShiftBit ($\omega_{RANGE}$) values will be necessary for decoding process in the decoding device.

The CPU 9121, using the MDCT coefficients X($\omega_{RANGE}$, 1), . . . , X($\omega_{RANGE}$, q($\omega_{RANGE}$)) loaded in step S9313, as well as the shift bit numbers ShiftBit($\omega_{RANGE}$) calculated in step S9323, calculates bit-shifted MDCT coefficients $X_{BS}(\omega_{RANGE}, 1), \ldots, X_{BS}(\omega_{RANGE}, q(\omega_{RANGE}))$ (step S9327). In other words, $$X_{BS}(\omega_{RANGE}, 1)=X(\omega_{RANGE}, 1)/\{2\hat{}\mathrm{ShiftBit}\omega_{RANGE})\},$$

$$\ldots,$$

$$X_{BS}(\omega_{RANGE}, q(\omega_{RANGE}))=X(\omega_{RANGE}, q(\omega_{RANGE}))/\{2\hat{}\mathrm{ShiftBit}(\omega_{RANGE})\}$$

The symbol ^denotes the exponent.

Figure 4C:
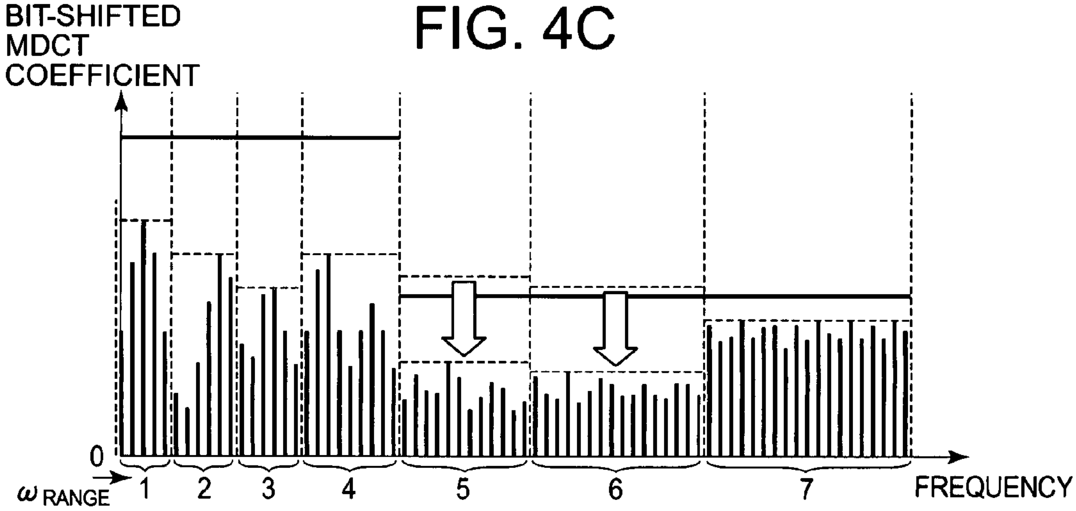
FIG. 4C shows bit-shifted MDCT coefficients.

For example, as shown in FIGS. 4B and 4C, in medium-segment bands 1 to 4 and 7, the MDCT coefficients therein being expressible with the set number of bits, the number of bits ShiftBit ($\omega_{RANGE}$) is 0, and therefore bit-shifted MDCT coefficients are calculated by dividing by 2 to the 0th power. Since, however, 2 to the 0th power is 1, in practical terms the values of the MDCT coefficients may be set as the bit-shifted MDCT coefficients as-is.

On the other hand, in medium-segment bands 5 and 6, the number of bits ShiftBit ($\omega_{RANGE}$) is 1, and therefore the MDCT coefficients in such medium-segment bands are divided by 2 to the 1st power (i.e., 2) to calculate the bit-shifted MDCT coefficients. As indicated by the arrows in FIG. 4C, the result of dividing the MDCT coefficients by 2 is that the bit-shifted MDCT coefficient values are halved.

Thus, although in FIG. 4B there were bands whose MDCT coefficients could not be expressed with the set number of bits, in FIG. 4C the MDCT coefficients for the entire frequency domain can be expressed with the set number of bits.

Incidentally, since the division in step S9327 is a division by a power of 2, the CPU 9121 need only conduct a right shift operation (a base 2 (binary) calculation).

For reducing a particular numerical value by division so that it can be expressed with a set number of bits, the numerical value of the divisor may be an arbitrary parameter. However, in the present embodiment, the divisor is limited to a power of 2. Thus, since the CPU 9121 need only conduct a right shift operation, calculation can be sped up, and the processing load can be lightened. As a result, the overall operational performance of the audio encoding/decoding device 9111 is improved.

The CPU 9121 stores the bit-shifted MDCT coefficients $X_{BS}((\omega_{RANGE}, 1), \ldots, X_{BS}(\omega_{RANGE}, q(\omega_{RANGE}))$ in the storage unit 9125 (step S9329).

The CPU 9121 determines whether or not bit-shifted MDCT coefficients have been calculated for all bands (step S9331). If all bands have been calculated (step S9331; YES), this calculation process ends. If there are still bands which have not been calculated (step S9331; NO), $\omega_{RANGE}$ is incremented by 1 (step S9333), and the process returns to step S9313.

(Re-quantization Process)

In the above-described process, the microphone 9151 faithfully picks up sound as a wave propagating through the air, and the magnitude of the amplitude of the sound wave is proportional to the loudness of the audio.

However, the characteristics of typical human hearing sensitivity tend, to a varying degree, to vary logarithmically with respect to sound loudness at all audio frequencies.

In other words, human hearing, while sensitive to slight differences in volume among soft sounds, is not very sensitive to differences in volume among loud sounds.

Taking such characteristics into consideration, quantizing soft sounds and loud sounds with uniform precision and then compressing the audio signal is not necessarily effective.

This being the case, the audio encoding/decoding device 9111, before encoding an audio signal, may quantize the audio signal. For example, low-volume audio may be quantized with a correspondingly high precision, and high-volume audio may be quantized with a correspondingly low precision. Quantization herein refers to approximating a quantity to be quantized with set discrete values.

However, during the A/D conversion by the audio processing unit 9141, the audio signal is already quantized once. In order to differentiate between these quantizations, the quantization herein described will be referred to as re-quantization.

Hereinafter, the re-quantization procedure will be described with reference to the schematic diagrams in FIGS. 5A, 5B, and 5C.

Figure 5A:
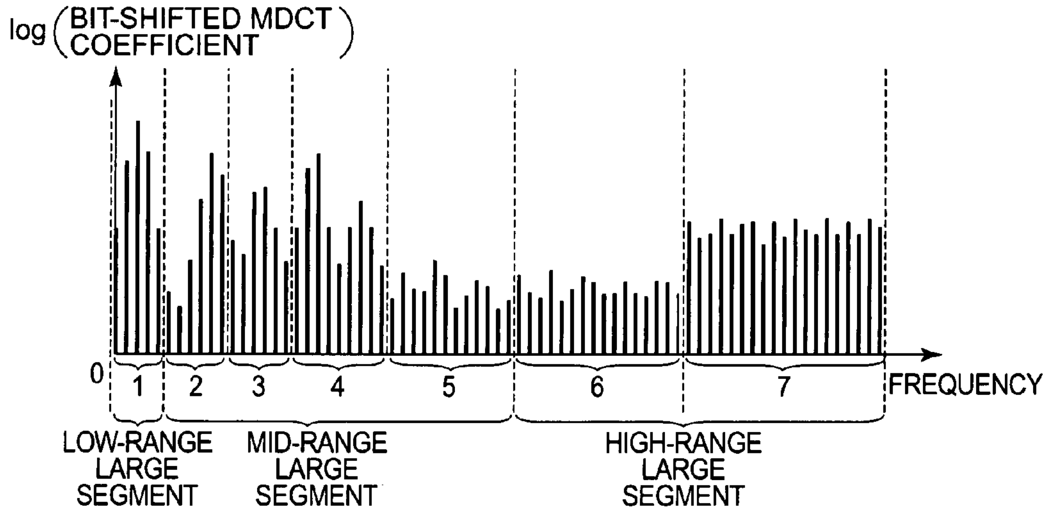
FIG. 5A shows the entire frequency domain separated into three large-segment bands.

FIG. 5A shows the relationship between the logarithms of the bit-shifted MDCT coefficients stored in the storage unit 9125 in step S9329, and the frequencies.

The CPU 9121, following the program stored in advance in the ROM 9123, sends/receives data between its internal register and the storage unit 9125, and by performing appropriate calculations on the values stored in the register, re-quantizes the data.

As described above, the characteristics of typical human hearing are such that, while being sensitive to slight differences in volume for soft sounds, humans are not very sensitive to differences in volume for loud sounds. This is true for all frequency domains. However, depending on the band, there are differences in the degree of the above-described sensitivity/insensitivity. In other words, the sensitivity of human hearing weakens with higher frequencies, even at the same volume. From this fact, in order to reduce the information volume in an audio signal while at the same time preventing sound quality degradation as perceived by humans, it is favorable to re-quantize at a high precision for low-frequency domains, but re-quantization may also be conducted at a low precision for high-frequency domains. In so doing, in order to suppress information volume, it is preferable to separate the audio signal into a plurality of bands having a particular width, and make uniform the re-quantization precision within each of the separated bands. If the re-quantization precision is varied too finely, processing becomes complex, and there is a possibility that the volume of information being handled will actually increase.

Furthermore, it is known that hearing sensitivity weakens logarithmically with higher frequencies. Stated differently, if a graph is plotted taking sensitivity as the vertical axis and the logarithm of the frequency as the horizontal axis, the sensitivity will linearly decrease in proportion to higher frequencies.

This being the case, it is preferable to logarithmically distribute over the frequency axis the frequencies signifying frequency band delimiters, these frequencies being one parameter for varying the re-quantization precision.

Incidentally, in the above-described bit-shift calculation process, the boundaries of the medium-segment bands are configured such that they are distributed logarithmically over the frequency axis. Accordingly, these medium-segment bands may be used as the units of processing for the re-quantization process.

In order to improve the compression ratio of the entropy encoding to be hereinafter described, it is preferable to separate bands in the same way as the medium-segment bands, i.e., with a logarithmically varying band width that acts as the units of processing for the re-quantization process, but wherein the bands are separated more broadly than the medium-segment bands. In so doing, the bands that act as the units of processing for the re-quantization process, being one parameter for varying the re-quantization precision, will be hereinafter referred to as large-segment bands. It is convenient to set one medium-segment band, or alternatively a plurality of successive medium-segment bands, equivalent to one large-segment band.

For example, it is preferable to separate the entire frequency domain into approximately 5 large-segment frequency bands.

However, even in the case where only about 3 large-segment bands are configured, it does not mean that the human-perceived sound quality will become extremely poor as compared to the case wherein a greater number of large-segment bands are configured. Consequently, the present embodiment is configured having 3 large-segment bands, called the low-range large segment, the mid-range large segment, and the high-range large segment.

That is to say, the frequency that is half the frequency of the upper limit value acts as the boundary between the mid-range large segment and the high-range large segment. The upper limit value is a finite value that is decided based on the sampling frequency implemented in the audio processing unit 9141; for example, the Nyqhist frequency. In other words, the entire frequency domain is separated into halves: a portion consisting of the combined low-range large segment and the mid-range large segment, and a portion consisting of the high-range large segment.

In addition, the low-range large segment is taken to be the first medium-segment band, counting from the low-range side. Alternatively, the low-range large segment may also be taken to be the first and the second, or at most the 1st-3rd medium-segment bands. In so doing, the respective boundaries of the three large-segment bands are decided.

The low-range large segment consists of a small number (1 to 3) medium-segment bands for the following reason. That is to say, while is it preferable to re-quantize the low-frequency portion with high precision since the characteristics of the audio signal appear prominently in the low-frequency portion, overly widening the low-range large segment contradicts the requirement that the information volume of the audio signal be reduced.

Figure 5B:
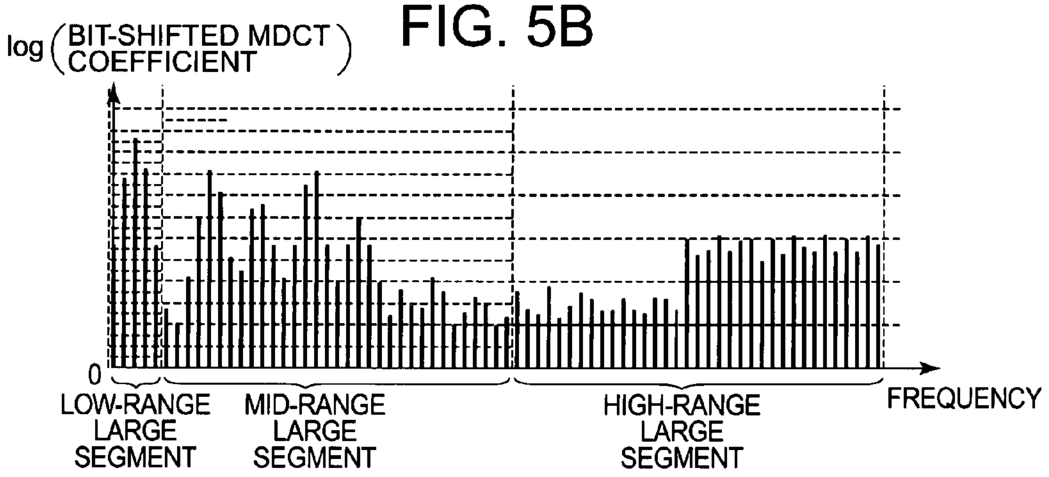
FIG. 5B shows the logarithms of bit-shifted MDCT coefficients before re-quantization.
Figure 5C:
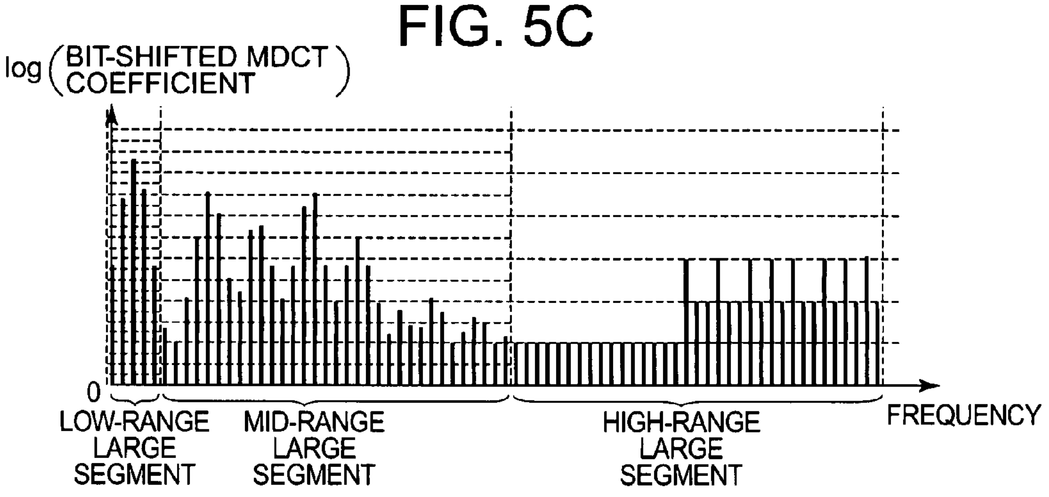
FIG. 5C shows the logarithms of bit-shifted MDCT coefficients after re-quantization.

FIGS. 5A, 5B, and 5C are diagrams for explaining the processing by which all frequency bands are separated into large-segment bands and re-quantized. In FIG. 5A, the frequency domain is separated into a total of 7 medium-segment bands, numbered 1 to 7.

First, as described above, the CPU 9121 sets a boundary between the mid-range large segment and the high-range large segment such that the entire frequency domain is equally divided into halves. At this point, the CPU 9121 sets one medium-segment band, or alternatively a plurality of successive medium-segment bands, equivalent to one large-segment band. In other words, a single medium-segment band does not belong to a plurality of large-segment bands. Accordingly, the CPU 9121 sets the boundary between the fifth medium-segment band and the sixth medium-segment band as the boundary between the mid-range large segment and the high-range large segment. In so doing, the high-range large segment consists of the sixth and the seventh medium-segment bands.

Next, the CPU 9121 sets the boundary between the low-range large segment and the mid-range large segment as the boundary between 1st medium-segment band and 2nd medium-segment band. At this point, the CPU 9121 may instead adopt the boundary between 2nd medium-segment band and 3rd medium-segment band.

In addition, it is also possible to adopt the boundary between 3rd medium-segment band and 4th medium-segment band. However, in this case, the width of the low-range large segment and the width of the mid-range large segment become approximately equal, and is thus incompatible for the purpose of re-quantizing with increasingly high precision for the low-frequency portions.

Thus, the low-range large segment consists only of the 1st medium-segment band, and the mid-range large segment consists of the 2nd through the 5th medium-segment bands.

To be specific, the re-quantization precision depends on the number of bits allocated to each large-segment band. For example, the re-quantization precision of the mid-range large segment is higher than the re-quantization precision of the high-range large segment by a factor corresponding to 1 bit, and the re-quantization precision of the low-range large segment is higher than the re-quantization precision of the mid-range large segment by a factor corresponding to another 1 bit. To increase the number of bits by 1 is to express the same quantity with double the precision. Each of the horizontal dotted lines in FIG. 5B illustrate this fact, being lines (graduation lines) showing the standard MDCT coefficient values for re-quantization. The precision of the mid-range large segment is thus two times higher than the precision of the high-range large segment, and the precision of the low-range large segment is two times higher than the precision of the mid-range large segment.

During re-quantization, the CPU 9121 matches the logarithm of a bit-shifted MDCT coefficient to one of the graduation lines, for example by discarding the fractional portion thereof. FIG. 5B is before re-quantization; FIG. 5C is after re-quantization. In the high-range large segment, the spacing between the graduation lines is large; that is to say, since the re-quantization precision is low, the data is considerably flattened. On the other hand, in the low-range large segment and the mid-range large segment, since the re-quantization precision is comparatively high, there is still much data variation after re-quantization.

The procedures for separating these large-segment bands and the numbers of bits for re-quantization are specified in the program read from the ROM 9123 by the CPU 9121. The CPU 9121, following this program, reads the bit-shifted MDCT coefficients stored in the storage unit 9125, takes the logarithms thereof, re-quantizes at a set precision set for each large-segment band, and stores the result (spectral information) in the storage unit 9125.

The CPU 9121 encodes the spectral information acquired as described above using a predetermined encoding method, and inputs it into the wireless communication unit 9161. The wireless communication unit 9161 loads the encoded data onto a wireless signal and transmits it via the antenna 9163.

(Encoding Process)

Figure 6A:
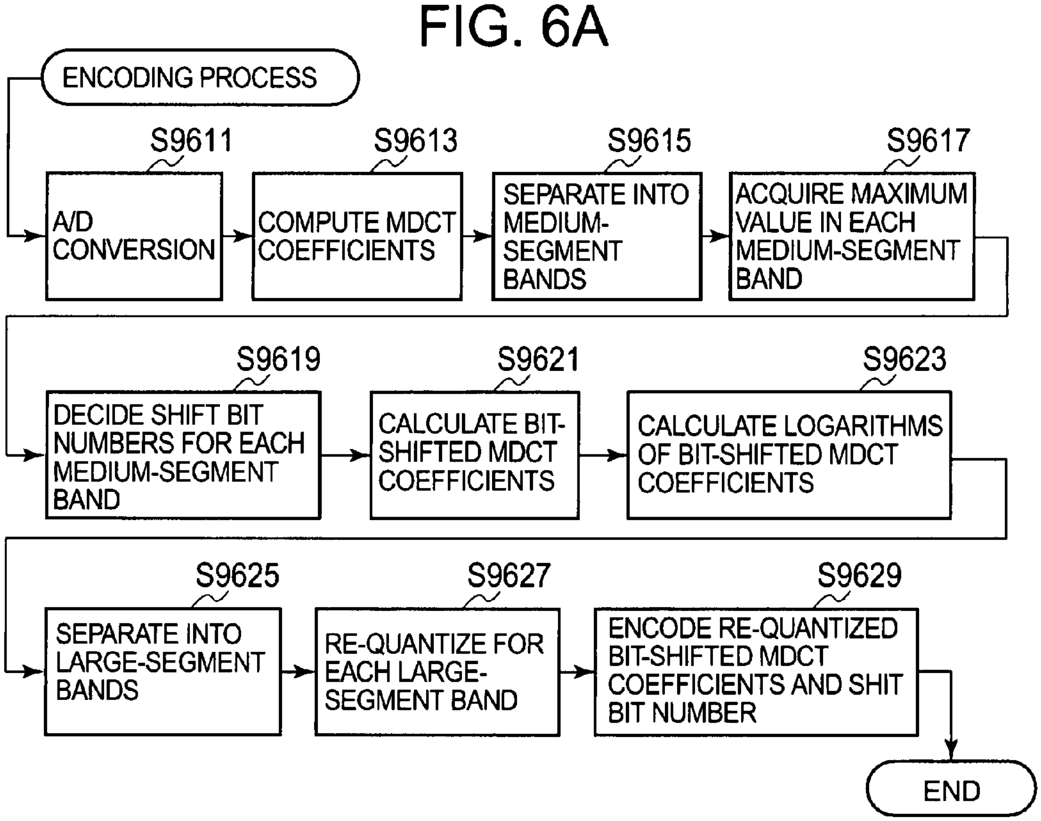
FIG. 6A shows audio signal encoding process in the first embodiment.

FIG. 6A is a flowchart explaining the encoding process of the audio encoding/decoding device 9111.

Human-produced sound is collected by the microphone 9151, and input into the audio processing unit 9141 as audio data. The audio processing unit 9141 A/D converts this audio data, resulting in a digital audio signal (step S9611). The CPU 9121, by calculating the MDCT coefficients, transforms the digital audio signal (a real-time domain signal) into a frequency domain signal, resulting in spectral data (step S9613). The CPU 9121 separates the spectral data into a plurality of medium-segment bands (step S9615). The CPU 9121 acquires the maximum value of the MDCT coefficients for each medium-segment band (step S9617).

The CPU 9121 allocates a predetermined number of bits to each medium-segment band according to the characteristics of human hearing. For each medium-segment band, the CPU 9121 compares the allocated number of bits and the maximum value of the MDCT coefficients acquired in step S9617, and determines the number of shift bits necessary for expressing the maximum value with the allocated number of bits (step S9619).

The predetermined numbers of bits are specified in the program stored in the ROM 9123.

However, it may also be configured such that the user, for example, is able to use the operation keys 9173 to change this number of bits. In this case, the CPU 9121 receives an instruction input to change the number of bits from the user, and updates the value read from the storage unit 9125 with the value indicated by the received instruction inputs.

Furthermore, the medium-segment band boundaries, the large-segment band boundaries, and the re-quantization precision may also be made rewritable by user instructions.

The CPU 9121 computes bit-shifted MDCT coefficients based on the number of shift bits determined in step S9619 (step S9621). The CPU 9121 executes division operations, but since the divisors are limited to powers of 2, conducting right bit shift operations is sufficient. This results in the advantages of faster encoding process and a lighter load on the CPU 9121.

The CPU 9121 calculates the logarithms of the acquired bit-shifted MDCT coefficients (step S9623), separates the entire frequency domain into predetermined large-segment bands (step S9625), and re-quantizes the MDCT coefficients at a predetermined precision (step S9627).

The CPU 9121 encodes the bit-shifted and re-quantized MDCT coefficients and the shift bit numbers (step S9629). The encoded information is transmitted to a receiving device via wireless communication or other means.

(Decoding Process)

Next, the decoding process executed by the device that receives encoded information such as the above-described will now be described. In the present embodiment, the receiving device is also an audio encoding/decoding device 9111. Generally speaking, an audio encoding/decoding device 9111, when operating as a receiving device, restores an audio signal using a procedure that is the reverse of the encoding and transmitting procedure described above.

The audio encoding/decoding device 9111 collects information transmitted via wireless communication or other means with the antenna 9163. The wireless communication unit 9161 stores the collected information in the storage unit 9125.

In other words, encoded data, such as the above-described bit-shifted and re-quantized MDCT coefficients and shift bit numbers, is stored in the storage unit 9125.

Figure 6B:
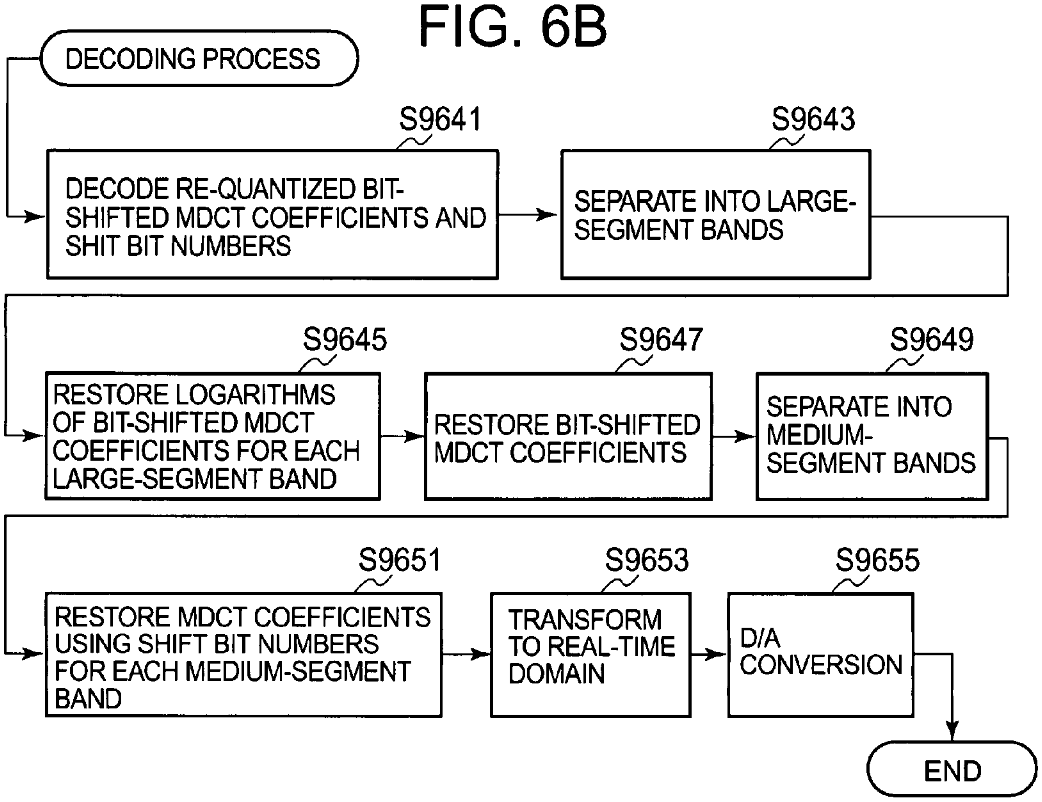
FIG. 6B shows audio signal decoding process.

The operations performed by the audio encoding/decoding device 9111 will now be described using the flowchart shown in FIG. 6B. The CPU 9121 executes decoding process, following the program stored in the ROM 9123.

A decoding method corresponding to the encoding method used in the encoding process is used. The CPU 9121 decodes the bit-shifted and re-quantized MDCT coefficients and the shift bit numbers (step S9641).

The CPU 9121 separates the entire frequency domain into set large-segment bands (step S9643). The CPU 9121 restores the logarithms of the bit-shifted MDCT coefficients for each large-segment band at a predetermined precision (step S9645). From the logarithms, the CPU 9121 restores the bit-shifted MDCT coefficients (step S9647).

The CPU 9121 separates the entire frequency domain into a plurality of set medium-segment bands (step S9649). The shift bit numbers corresponding to each medium-segment band are acquired in step S9641. Using these shift bit numbers, the CPU 9121 restores the MDCT coefficients (step S9651). Restoration is conducted using multiplication operations, but since the multipliers are limited to powers of 2, the CPU 9121 need only perform left-shift operations. Since a single multiplication operation is achieved with a single left-shift operation, this has the advantages of faster decoding process and a lighter load on the CPU 9121.

Having restored the MDCT coefficients for the frequency domain in this way, the CPU 9121, using an inverse MDCT transformation, transforms the digital audio signal from the frequency domain to the real-time domain (step S9653). The audio processing unit 9141 A/D converts the acquired digital audio signal (step S9655), and outputs an analog audio signal from the speaker 9153. Audio signal restoration is thus completed.

(Second Embodiment)

Next, an audio encoding/decoding device 9111 in accordance with the second embodiment of the present invention will be described. The storage unit 9125 of the present embodiment additionally stores shift bit numbers for amplitude suppression in the real-time domain, characteristic quantities per band for encoding, and code lengths.

Figure 7A:
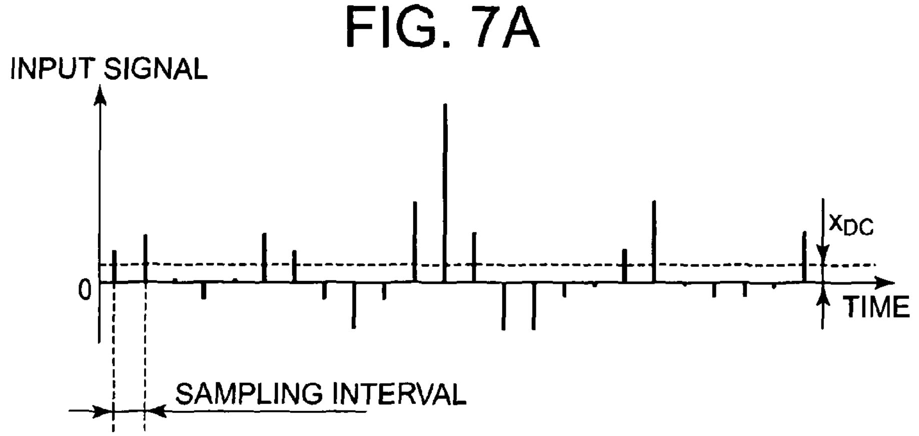
FIG. 7A shows a real-time domain audio signal in the second embodiment.

First, audio encoding process will be described. In the same manner as the first embodiment, an analog audio signal collected by the microphone 9151 is subjected to A/D conversion by the audio processing unit 9141, and becomes a digital audio signal, as shown in FIG. 7A. The digital audio signal is a signal having, for example, a 16 kHz sampling frequency and 16-bit quantization. The digital audio signal is stored in the storage unit 9125. Because of the characteristics of the microphone 9151, the digital audio signal stored in the storage unit 9125 includes a direct current component XDC that is unnecessary for audio playback, as shown in FIG. 7A. By using the well-known high-pass filter or other technique, such direct current components XDC are removed.

The digital audio signal, the direct current component having been removed therefrom, is divided into frames as the unit of compression process. It is ideal to have 3 to 4 MDCT blocks contained in a single frame. At this point, for the sake of simplicity in understanding, it will be assumed that only one MDCT block is contained in one frame, as with the case of the first embodiment.

The CPU 9121, for each individual digital input signal stored in the storage unit 9125, allocates the frame number to which the signal belongs, and a number indicating the ordinal position of the signal value within the frame.

The CPU 9121 reads the program stored in the ROM 9123 and conducts the following process based thereon.

Figure 7B:
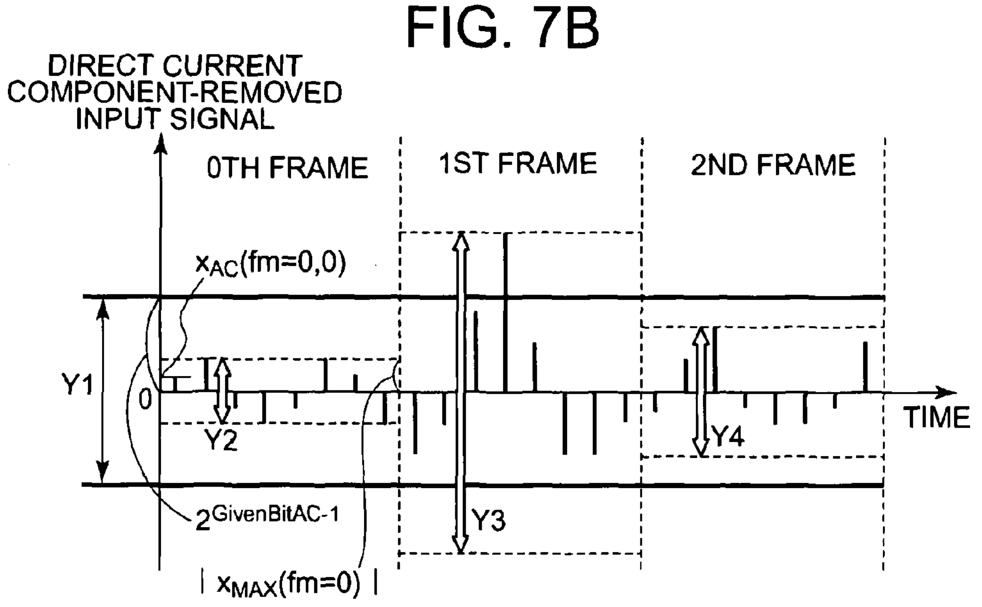
FIG. 7B shows an audio signal before dynamic range adjustment.

Each frame contains M input signal samples. As shown in FIG. 7B, respective input signal samples are differentiated: the first sample belonging to the 0th frame is $x_{AC}$(fm=0, 0), the second sample belonging to the 0th frame is $x_{AC}$(fm=0, 1), . . . , and the last sample belonging to the 0th frame is $x_{AC}$(fm=0, M−1); the first sample belonging to the 1st frame is $x_{AC}$(fm=1, 0), . . . , and the last sample belonging to the 1st frame is $x_{AC}$(fm=1, M−1), etc. In FIG. 7B, the sample $x_{AC}$(fm=0, 0) is written as an example.

Also, the input signal shown in FIG. 7A, that undergoes displacement in the vertical direction of a direct current component $x_{DC}$, is the input signal shown in FIG. 7B.

The CPU 9121, in order to determine whether or not it is necessary to adjust the dynamic range for each frame, acquires for each frame the maximum amplitude of the input signal per frame contained in the corresponding frame. In other words, the maximum amplitude in the 0th frame $|x_{MAX}$(fm=0)$|$, the maximum amplitude in the 1st frame $|x_{MAX}$(fm=1)$|$, the maximum amplitude in the 2nd frame $|x_{MAX}$(fm=2)$|$ . . . are evaluated.

As shown in FIG. 7B, allowed amplitudes are those within the region indicated by the arrow Y1. In other words, taking the above-described set number of bits as GivenBitAC, input signals are allowed up to those with amplitudes within $\pm 2^{GivenBitAC-1}$The (−1) term in the exponent is appended because one bit is necessary for differentiating positive/negative. A GivenBitAC value of 10 bits, for example, is ideal.

The respective maximum amplitudes for each frame are indicated by the arrows Y2, Y3, and Y4 in FIG. 7B. In this figure, since the maximum amplitudes in the 0th and the 2nd frames are less than the permissible amplitude, it is not necessary to adjust the dynamic range of the input signal therein. On the other hand, since the maximum amplitude in the 1st frame exceeds the permissible amplitude, it is necessary to adjust the dynamic range of the input signal therein.

As an example of a dynamic range adjustment, by dividing the input signal contained in the frame by a power of 2, the maximum amplitude is brought within the permissible amplitude. The CPU 9121 can conduct division by a power of 2 at high speed and with a light. However, if the input signal is made needlessly small, the sound quality of the audio that is later restored by the decoding device is degraded. Consequently, the number used as the divisor in the above-described division operation (numerical parameter), being a power of 2, is taken to be the smallest value among the numbers that allows the maximum amplitude to be within the permissible amplitude.

Figure 7C:
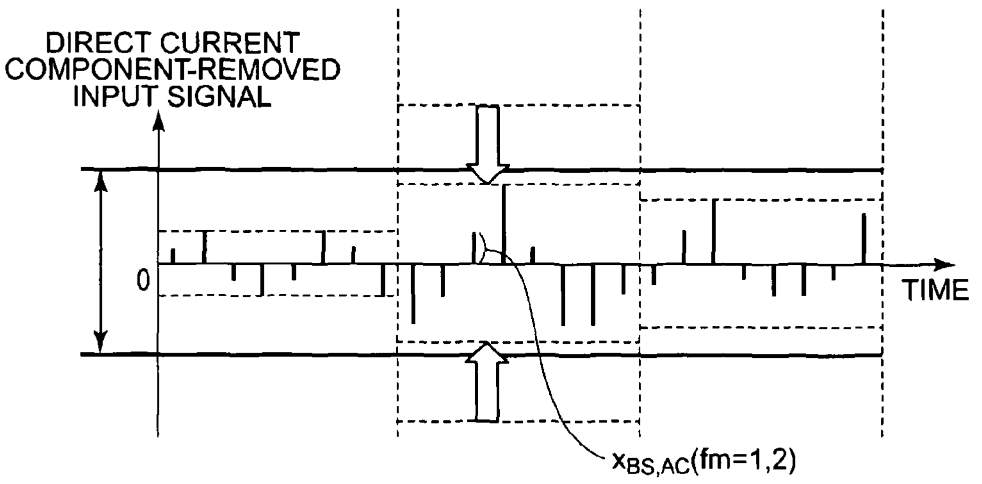
FIG. 7C shows an audio signal after dynamic range adjustment.

In the case of FIG. 7B for example, the amplitude of the input signal in the 1st frame is halved, as shown in FIG. 7C. This means dividing by the 1st power of 2 is sufficient. In other words, the shift bit number for amplitude adjustment of the 1st frame is 1.

Even for the non-bit-shifted 0th and the 2nd frames, it may be thought for convenience that division by $2^0$, i.e., 1, was conducted, and treat the shift bit number for amplitude adjustment as being 0. In so doing, the direct-current-component-removed and amplitude-adjusted input signals are differentiated in the following way: the first sample belonging to the 0th frame is $x_{BS,AC}$(fm=0, 0) , the second sample belonging to the th frame is $x_{BS,AC}$(fm=0, 1) . . . and the last sample belonging to the 0th frame is $x_{BS,AC}$(fm=0, M−1); the first sample belonging to the 1st frame is $x_{BS,AC}$(fm=1, 0) . . . and he last sample belonging to the 1st frame is $x_{BS,AC}$(fm=1, M−1).

(Dynamic Range Adjustment Process)

Figure 8:
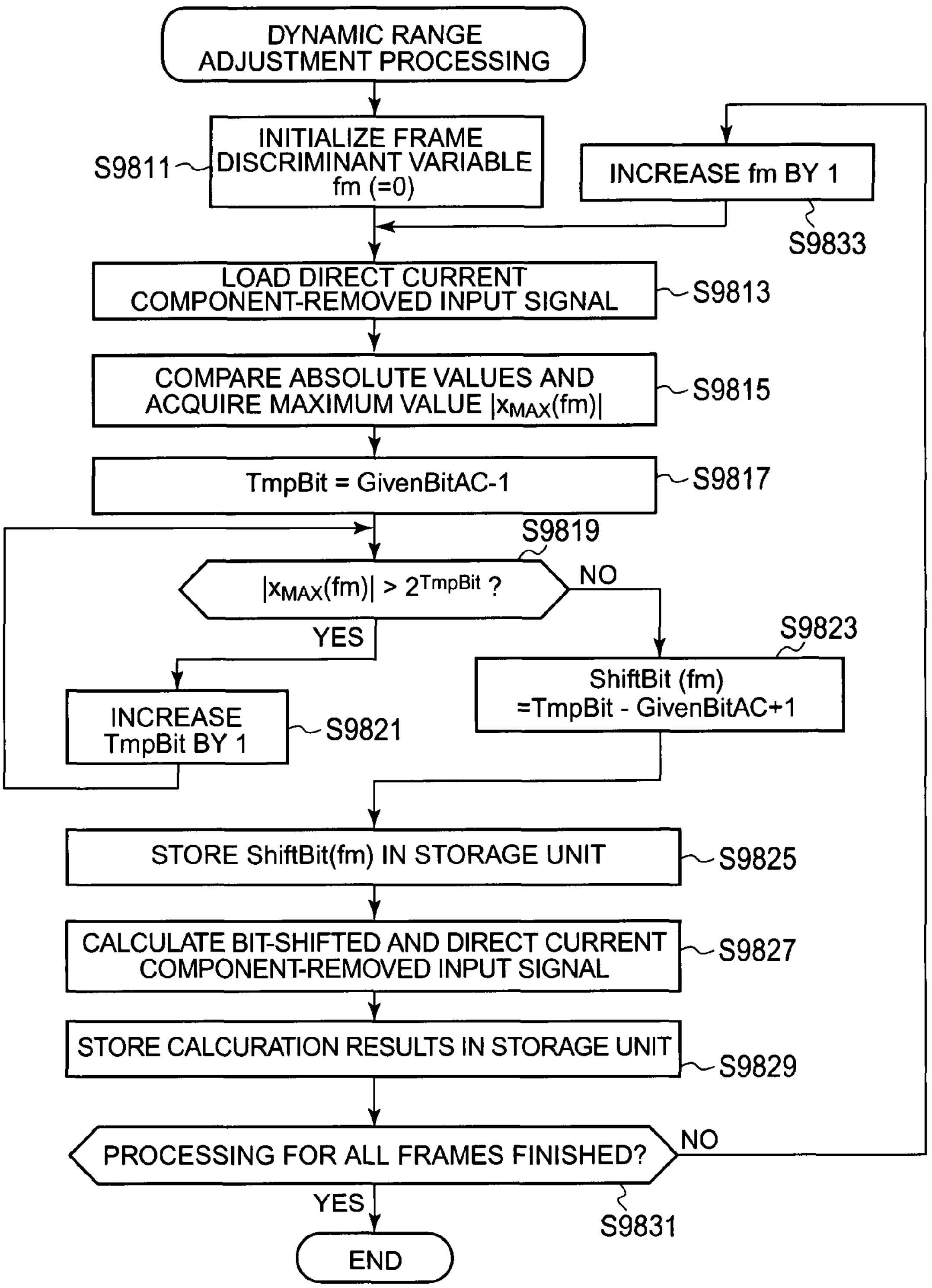
FIG. 8 is a flowchart showing dynamic range adjustment process in the second embodiment.

Next, the detailed procedure of this dynamic range adjustment will be described using the flowchart shown in FIG. 8. By passing the original input signal through a well-known high-pass filter, the direct current component is largely removed, and the input signal from which the direct current component has been largely removed is stored in the storage unit 9125.

The CPU 9121 readies its counter register for storing the frame discriminant variable fm, and sets fm=0 as the initial value (step S9811).

The CPU 9121 loads into the general-purpose register the direct-current-component-removed input signals $x_{AC}$ (fm, 0), . . . , $x_{AC}$(fm, M−1) from the storage unit 9125 (step S9813). The CPU 9121 compares the absolute values of these values (in other words, $|x_{AC}$(fm, 0)|, . . . , $|x_{AC}$(fm, M−1)|), and acquires the maximum value $|xM_{AC}$(fm)| of the absolute values for the samples in the frame (step S9815).

In a counter register separate from the counter register for storing the frame discriminant variable, the CPU 9121 stores a temporary variable TmpBit. The CPU 9121 sets TmpBit=GivenBitAC−1 as an initial value (step S9817). The initial value corresponds to the number of bits given when the amplitude adjustment target value is expressed in binary number Next, in step S9819, the CPU 9121 determines whether or not $|x_{MAX}$(fm)| is larger than $2^{TmpBit}$ (step S9819). If larger (step S9819; YES), TmpBit is increased by 1, and the process returns again to step S9819. Conducted in this way, $|x_{MAX}$ (fm)| will become lower than $2^{TmpBit}$ eventually (step S9819; NO). The CPU 9121, by computing ShiftBit(fm)=TmpBit−GivenBitAC+1, calculates the bit shift number ShiftBit(fm) (step S9823), and stores the result in the storage unit 9125 (step S9825).

As in the case of the 0th or the 2nd frames in FIG. 7B, for example, if the amplitude of the input signal in the frame is within the tolerance from the beginning (if $|x_{MAX}$ (fm)|=$2^{GivenBitAC-1}$), step S9819 becomes NO, and ShiftBit (fm)= 0.

On the other hand, in the case of the 1st frame in FIG. 7B, for the initial value GivenBitAC−1 for TmpBit, step S9819 becomes YES. Since $|x_{MAX}$(fm)|=$2^{GivenBitAC}$, when TmpBit is increased by 1 in the first iteration of step S9821, the second iteration of step S9819 becomes NO, and the process proceeds to step S9823. In step S9823, the following calculation is performed, and the shift bit number becomes 1:

$$\text{ShiftBit(fm)=TmpBit--GivenBit}AC\text{+1=\{TmpBit initial value+1\}−GivenBit}AC\text{+1=\{(GivenBit}AC\text{−1)+1\}−GivenBit}AC\text{+1=1}$$

Next, the CPU 9121 calculates the bit-shifted and direct-current-component-removed input signal according to the following equation (step S9827):

$$x_{BS,AC}(fm, 0)=x_{AC}(fm, 0)/2^{ShiftBit(fm)},$$

$$\ldots,$$

$$x_{BS,AC}(fm, M-1)=x_{AC}(fm, M-1)/2^{ShiftBit(fm)}$$

Since the divisor is limited to powers of 2, the CPU 9121 need only conduct one right shift operation per one division operation.

The CPU 9121 stores the calculated results $x_{BS,AC}$(fm, 0), . . . , $x_{BS,AC}$(fm, M−1) acquired in this way in the storage unit 9125 (step S9829). 1 bit per 1 value is used for differentiating positive/negative.

The CPU 9121 determines whether or not the process for all frames is finished (step S9831). In the case where it is determined that the process for all frames is finished (step S9831; YES), the dynamic range adjustment process ends. In the case where it is determined that the process for all frames is still unfinished (step S9831; NO), the frame differentiating variable fm is increased by 1 for the processing of the next frame (step S9833), and the dynamic range adjustment process returns to step S9813.

Subsequently the CPU 9121, for each frame, transforms the signal from the real-time domain to the frequency domain using the MDCT, decides shift bit numbers for each medium-segment band, and re-quantizes the data for each large-segment band, as in the first embodiment Subsequently, in the first embodiment, audio spectra for the entire frequency domain were encoding and transmitted. In contrast, in the case of the present embodiment, encoding bands are newly introduced. Moreover, the CPU 9121 separates the entire frequency domain into several encoding bands, and encodes and transmits only the MDCT coefficients belonging to the encoding bands whose importance is inferred to be high. MDCT coefficients belonging to the encoding bands whose importance is inferred to be low are neither encoded nor transmitted. Furthermore, the MDCT coefficients of the encoding bands that are not received on the receiving side are treated as 0. In other words, among the audio spectra, only the portions inferred to be important are sent/received.

Figure 9A:
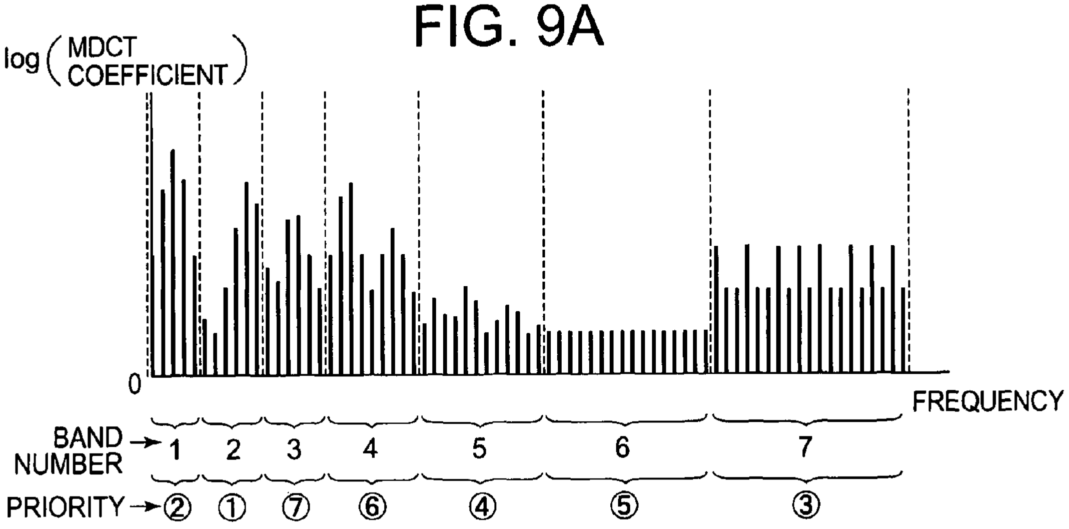
FIG. 9A shows the encoding bands and priorities in the second embodiment.

FIG. 9A shows the relationship between the logarithms of the MDCT coefficients and the frequencies. In other words, FIG. 9A is the spectra acquired from the results of transforming the input signals in certain frames from the real-time domain to the frequency domain.

The description hereinafter will assume that the above-described re-quantization process has already taken place.

First, the CPU 9121 divides the entire frequency domain into encoding bands. Band numbers 1, 2, 3, etc., are appended in succession to the encoding bands from the low-frequency side. The width of each encoding band, although required to be greater than the width of the small-segment bands, need not have any particular association with the medium-segment bands or the large-segment bands.

As an example, in FIG. 9A the frequency domain is separated into seven encoding bands. For these seven encoding bands, the CPU 9121 respectively acquires an importance level according to a predetermined standard, and assigns priorities in order of descending importance. A concrete example of the way to acquire the importance level is hereinafter described.

In FIG. 9A, priorities are represented by the circled numbers. For example, the priority of encoding band no. 2 is 1st. This indicates that, among all the encoding bands, the CPU 9121 will encode band no. 2 with the highest priority. Continuing down in the same manner, the band with the 2nd priority is encoding band no. 1, the band with the 3rd priority is encoding band no. 7, . . . and the band with the lowest priority is encoding band no. 3.

The reason for introducing encoding bands and deciding priorities in this way is because, in the present embodiment, an entropy encoding method is adopted as the encoding method. One feature of entropy encoding methods is that, even if the information compression precision is fixed, the compression ratio is not fixed. In other words, if a plurality of differing data of the same length is entropy encoded, there are cases wherein the code lengths after encoding are all different, due to bias differences in the occurrence frequency of data elements in the original data. That is, entropy encoding methods, when compared to other encoding methods that do not exhibit bias in information compression precision, may happen to have a higher compression ratio, or conversely have a lower ratio. Typically it is difficult to predict the compression ratio in advance, and until entropy encoding is actually conducted, it is unknown whether a high compression ratio is achievable.

In the present embodiment, the advantages of entropy encoding methods are maximally utilized while consideration is taken so that, insofar as is possible, the effects of its shortcomings do not occur. For example, there are cases where code lengths are limited due to conditions such as the communication rate. The audio encoding/decoding device 9111 entropy encodes the MDCT coefficients for as many encoding bands as possible. If the code length fits within the limit, much of the information can be transmitted, and it becomes possible to decode audio with high sound quality. In the case where the code length after entropy encoding exceeds the limit, the encoding bands are selected in descending order of priority, and low-priority bands are not selected. As a result, the total code length is brought within the limit. Since the portions of the audio signal corresponding to the encoding bands with high priority are transmitted to the receiving device, even if some of the bands for encoding are removed, degradation of sound quality can be kept to the minimum.

Figure 9B:
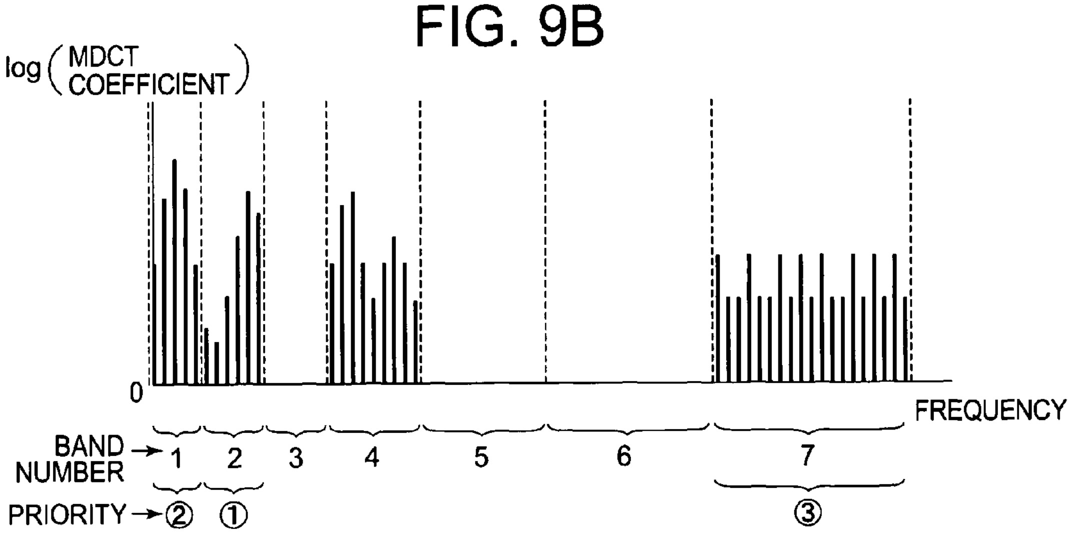
FIGS. 9B and 9C show MDCT coefficients entropy encoded based on the priorities.

In FIG. 9B for example, the CPU 9121 entropy encodes the MDCT coefficients of the bands with the 1st to 3rd priorities, i.e., 1st, 2nd, and 7th encoding bands. In the case where the total code length is less than the set code length, at this time all of the MDCT coefficients of the selected encoding bands can be sent to the receiving device. Even in this condition, the receiving device may be able to restore audio of relatively high sound quality. However, if encoding band no. 5 (the band with the 4th priority) can also be included and its MDCT coefficients transmitted to the receiving device, the receiving device should be able to acquire audio of even higher sound quality.

Figure 9C:
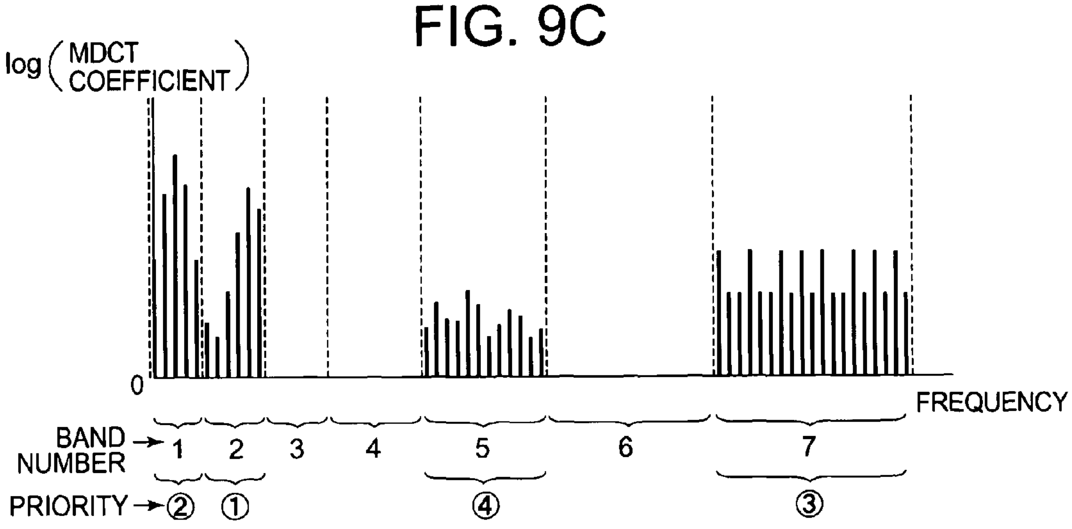

Consequently, if there is room in the code length (communication capacity), the CPU 9121 entropy encodes the MDCT coefficients of the encoding band with the 4th priority, as shown in FIG. 9C. As a result, in the case where the code length exceeds the set code length (communication volume), the CPU 9121 transmits the entropy-encoded data containing the MDCT coefficients for up to the encoding band with the 3rd priority, and does not transmit the data for the band with the 4th priority. On the other hand, in the case where the code length does not exceed the set code length, the CPU 9121 transmits the entropy-encoded data containing the MDCT coefficients for the 1st-4th encoding bands. The CPU 9121 may also furthermore entropy-encode the MDCT coefficients of the encoding band with the next priority, repeating these steps.

However, even if a priority is decided for an encoding band contained in the entropy encoded data and corresponding to a particular single frame (or MDCT block), it does not follow that the encoding band should be entropy encoded with the same priority for a different frame (or MDCT block). As described in the foregoing, entropy encoding methods, depending on the nature of the data to be encoded (for example, the spectral shape, etc.), have cases wherein a high compression ratio is acquired, and cases wherein a high compression ratio is not acquired. For example, if for certain frames or MDCT blocks, encoding up to the encoding band with the 2nd priority does not exceed the set code length, it is possible that for different frames or MDCT blocks, encoding up to the encoding band with the 4th priority will surpass the communication volume limit. Thus, typically the entropy encoding priorities will differ for every frame.

If the receiving device restores frames that were able to achieve a high compression ratio, the audio of that frame played back by the receiving device will have high sound quality. If the receiving device restores frames that were not able to achieve a high compression ratio, the original information volume will be low; in other words, only a small portion of the spectrum will be received, and therefore the sound quality will be relatively degraded. However, because the portions with high importance for audio playback are preferentially selected from among the entire spectrum, the degradation of sound quality is kept to the minimum limit.

As examples of representative entropy encoding methods, the Huffman code and RangeCoder are cited herein.

(Priority Decision Process)

Next, the process for deciding priority will be described using the flowchart shown in FIG. 10. Furthermore, in the description hereinafter, the audio encoding/decoding device 9111 is to be adopted as both the sending device and the receiving device.

The decision of how many encoding bands to divide the frequency domain into, as well as the decision of how high boundary frequency to set, are specified in advance in the program stored in the ROM 9123. The information for these decisions is shared by the sending side and the receiving side. Consequently, it is essentially unnecessary to send information relating to these decisions from the sending device to the receiving device.

However, it may also be configured such that the user of the sending device is allowed to conduct configuration relating to the encoding bands via the operation keys 9173. In this case, it may be configured such that information regarding the number of encoding bands and the boundary frequencies thereof is sent from the sending device to notify the receiving device. Alternatively, it may be configured such that the user changes the configuration via the operation keys 9173 so that the configuration of the receiving device becomes the same as that of the sending device. In addition, in the case where the sending device or the receiving device permits user configurations such as those described above, it is configured such that the various configuration values decided by the user are stored in the storage unit 9125, and that the program stored in the ROM 9123 reads the various configuration values from the storage unit 9125.

With the number of encoding bands as well as the default values of the boundary frequencies for each band being decided in advance, it may be configured such that the default values are adopted as-is, or are variable according to the frame. On the other hand, for information about which priority numbers are to be assigned to which encoding bands, it is necessary to make decisions by priority decision process for every time period corresponding to each frame or MDCT block, or in other words, for every single spectrum.

As described above, the CPU 9121 has already assigned band numbers in succession from the low-frequency side to the respective encoding bands. At this point, the CPU 9121 correlates the band numbers and the priority numbers.

A variable (band discriminant variable) for differentiating encoding bands for processing is represented as $\omega_{CRNG}$. The CPU 9121, following the program stored in the ROM 9123, readies a counter register for storing $\omega_{CRNG}$, and sets an initial value $\omega_{CRNG}=1$ (step S1011). In other words, this process is conducted successively from the low-frequency side.

Next, the CPU 9121 loads all of the MDCT coefficients $X(\omega_{CRNG}, 1) \ldots X(\omega_{CRNG}, r(\omega_{CRNG}))$ belonging to the encoding band with number $\omega_{CRNG}$ from the storage unit 9123 into the general-purpose register (step S1013).

Herein, $r(\omega_{CRNG})$ represents the total number of MDCT coefficients within the encoding band with number $\omega_{CRNG}$. However, if adopting the embodiment wherein the encoding bands are made the same as the medium-segment bands, $r(\omega_{CRNG})=q(\omega_{CRNG})$ holds true.

In the present embodiment, as an example, the sum of the MDCT coefficients belonging to a particular encoding band is taken as the total energy in the encoding band, and the higher the total energy, the higher the importance level. Furthermore, since there is the possibility that negative numbers are included among the MDCT coefficients, it is preferable to take the sum of the squares of the MDCT coefficients. However, in the present embodiment it is assumed that the MDCT coefficients are positive numbers and so the simple sum is taken.

Because spectral characteristics qualitatively appear in the portions of large energy, such as for example the spectral peak portions, such an importance level decision method is appropriate.

The CPU 9121 calculates the total energy $g(\omega_{CRNG})$ of an encoding band with umber $\omega_{CRNG}$ (step S1015):

$$g(\omega_{CRNG})=X(\omega_{CRNG},1)^2+\ldots+X(\omega_{CRNG},\ q(\omega_{CRNG}))^2$$

The CPU 9121 stores the calculation result in the storage unit 9125 (step S1017).

It may also be configured such that the value acquired by appending set weighting coefficients to the calculated $g(\omega_{CRNG})$ is taken as the total energy. In this case, it is good to take into consideration the fact that human hearing is sensitive to low-frequency sounds, and append weighting coefficients that increase with lower frequencies. For example, the total energy of an encoding band of less than 500 Hz is multiplied by a weighting coefficient 1.3, an encoding band equal to or greater than 500 Hz but less than 3500 Hz is multiplied by a weighting coefficient 1.1, and an encoding band equal to or greater than 3500 Hz is multiplied by a weighting coefficient 1.0. Even if the energy of the lowest encoding band on the low-frequency side and the energy of the highest encoding band on the high-frequency side happen to have exactly equivalent values, when considering the characteristics of human sense of hearing, the importance level of the low-frequency side is higher. In other words, if the code length has a limit, by increasing the weighting of the low-frequency side and then encoding, the quality of the audio played back at the receiving device improves.

Furthermore, it is not strictly necessary for the boundary frequencies which change the weighting coefficients and the boundary frequencies of the encoding bands to match. In the case where a plurality of weighting coefficients exist in the same encoding band, individual MDCT coefficients belonging to the medium-segment band are multiplied by a weighting coefficient according to the frequencies, and the total energy may be subsequently calculated.

Next, the CPU 9121 determines whether or not the process for all encoding bands has finished, in other words, whether or not the process for the highest encoding band on the high-frequency side has finished (step S1019). If still unfinished (step S1019; NO), $\omega_{CRNG}$ is increased by 1 to process the next encoding band on the high-frequency side (step S1021), and the process returns to step S1013.

If the process has finished for all the encoding bands (step S1019; YES), the total energies g(1) to $g(\omega_{MaxCRNG})$ for all of the encoding bands are stored in the storage unit 9125. $\omega_{MaxCRNG}$ is the maximum value of $\omega_{CRNG}$. The CPU 9121 loads all the total energies g(1) to $g(\omega_{MaxCRNG})$ into the general-purpose register, sorts them in descending order, and configures high priorities in order of descending total energy (step S1023). Band numbers of priority P are represented as $\omega_{CRNG}(P)$.

The CPU 9121 respectively stores the calculated results $\omega_{CRNG}(P)$ in the storage unit 9125 (step S1025).

Furthermore, an upper limit value may also be set on the total number of encoding bands in one frame to be sent to the receiving device, and priorities are assigned only to the extent that this upper limit value is not exceeded. For example, if there are 10 encoding bands in 1 frame and the upper limit value is 5, the 1st to 5th priorities may be assigned, and the 6th and later priorities may be omitted.

(Entropy Encoding Process)

Figure 11:
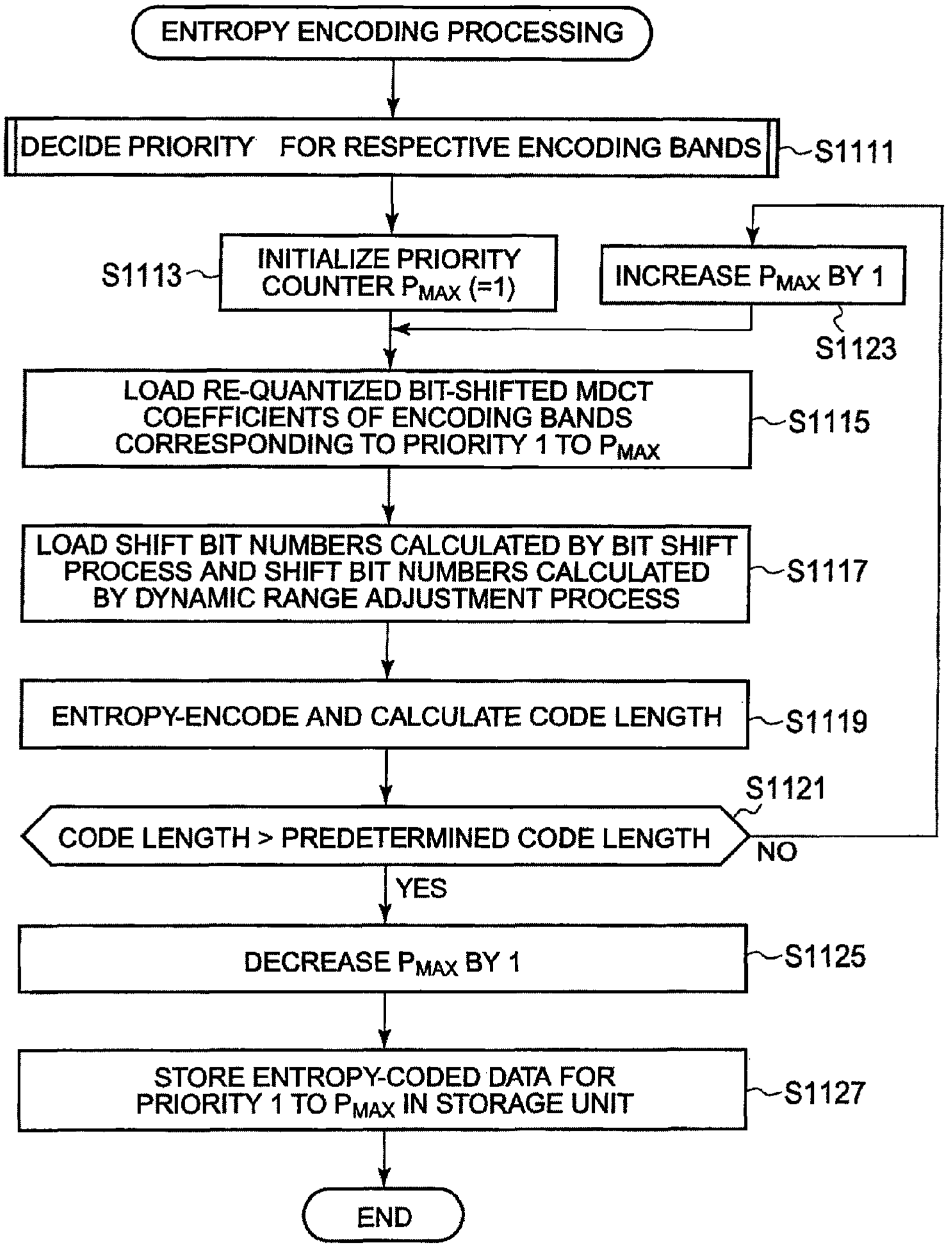
FIG. 11 is a flowchart showing entropy encoding process in the second embodiment.

Next, entropy encoding process will be described in further detail, using the flowchart shown in FIG. 11.

Figure 10:
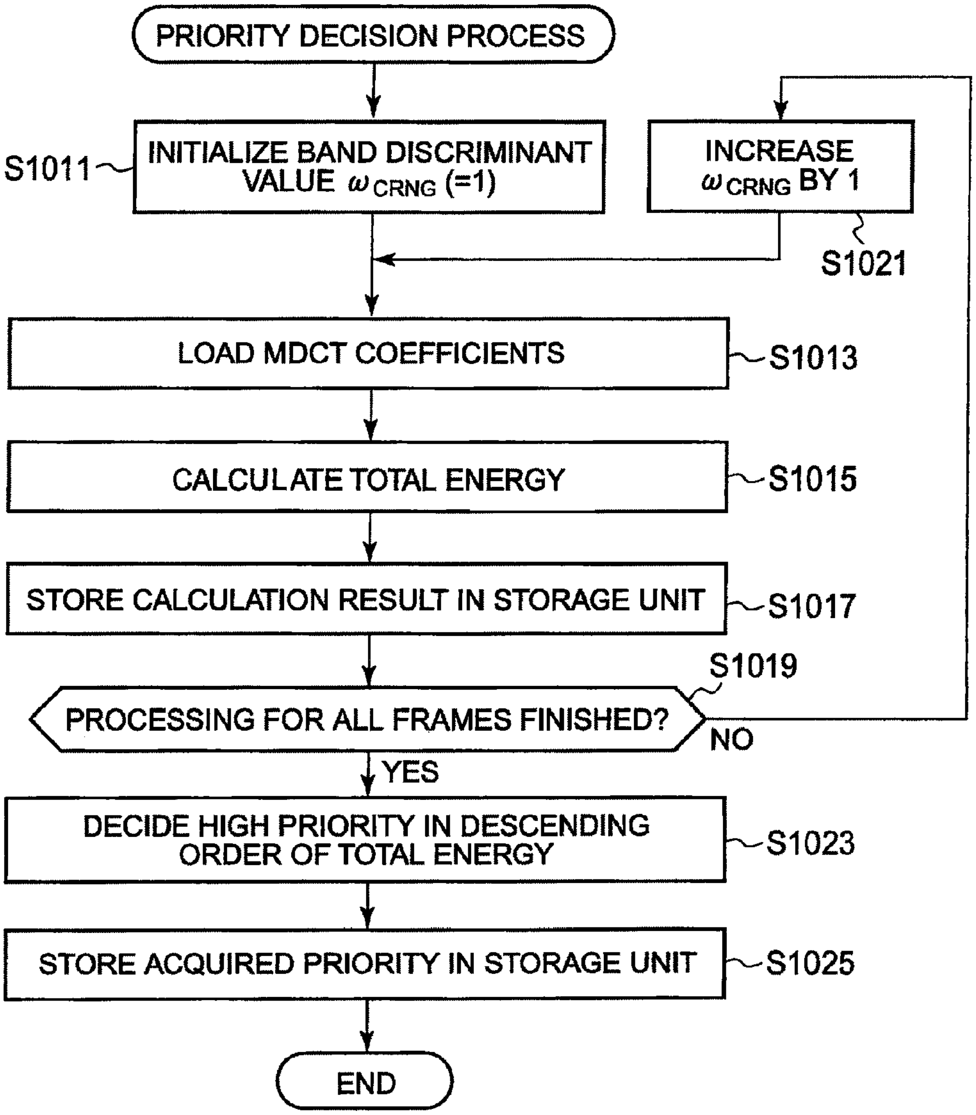
FIG. 10 is a flowchart showing priority decision process in the second embodiment.

First, the CPU 9121, following the procedure shown in FIG. 10, respectively assigns priority to the encoding bands (step S1111).

Next, the CPU 9121, following the program stored in the ROM 9123, sets a counter indicating the priorities up to which the encoding bands will be encoded, $P_{MAX}$, and sets an initial value of 1 ($P_{MAX}$=1) (step S1113).

Next, the CPU 9121 loads from the storage unit 9125 the re-quantized bit-shifted MDCT coefficients of the encoding bands corresponding to the 1st to $P_{MAX}$-th priorities (step S1115). MDCT coefficients X are respectively represented like the following:

$$X_{QBS}(\omega_{CRNG}(1),1),\ldots,X_{QBS}(\omega_{CRNG}(1),q(\omega_{CRNG}(1))),$$

$$\ldots,$$

$$X_{QBS}(\omega_{CRNG}(P_{MAX}),1),\ldots,X_{QBS}(\omega_{CRNG}(P_{MAX}),q(\omega_{CRNG}(P_{MAX})))$$

The subscript QBS indicates that the MDCT coefficients have been re-quantized and bit-shifted.

In order to restore audio at the receiving device, shift bit numbers are also necessary. The medium-segment bands in which bit-shifting is used are decided with no relation to the encoding bands. Consequently, it is necessary for the CPU 9121 to evaluate the way in which the encoding bands to be encoded are overlapping the medium-segment bands, and acquire shift bit numbers for each medium-segment band. Thus, the CPU 9121 loads the shift bit numbers ShiftBit $(\omega_{RANGE})$ of all of the medium-segment bands $\omega_{RANGE}$ that overlap with the encoding bands corresponding to the 1st to $P_{MAX}$-th priorities. In addition, CPU 9121 loads the shift bit numbers used during dynamic range adjustment process (step S1117).

Next, the CPU 9121 entropy-encodes (1) the re-quantized bit-shifted MDCT coefficients $X_{QBS}$, (2) the shift bit numbers acquired by the bit shift process, and (3) the shift bit numbers acquired by the dynamic range adjustment process, and calculates the code length of the acquired entropy code data (step S1119).

Next, the CPU 9121 determines whether or not the code length calculated in step S1119 is longer than a predetermined code length (step S1121). The set code length is a length determined according to the restrictions of the communication volume, etc. Code that exceeds the set code length cannot be correctly transmitted to the receiving device due to overflows, etc., so the transmission code length must be at or below the set code length.

In the case where the calculated code length does not exceed the set code length (step S1121; NO), the communication volume still has some room, and so there is a possibility that the next encoding band in the priority can be encoded. Consequently, $P_{MAX}$ is increased by 1 (step S1123), and the process returns to step S1115.

In the case where the calculated code length exceeds the set code length (step S1121; YES), information up to the encoding band with $P_{MAX}$-th priority cannot be correctly transmitted at this time. However, if the information is up to the encoding band with priority of one before $P_{MAX}$, it should be at or less than the set code length. Consequently, the CPU 9121 reduces $P_{MAX}$ by 1 (step S1125), takes (1) the re-quantized bit-shifted MDCT coefficients of the encoding bands corresponding to the 1st to $P_{MAX}$-th priorities, (2) the shift bit numbers acquired by the bit shift processing, and (3) the shift bit numbers acquired by the dynamic range adjustment process as entropy code data, and stores it in the storage unit 9125 (step S1127).

In this way the generated entropy code data becomes transmittable to the receiving device.

(Encoding Process)

Figure 12A:
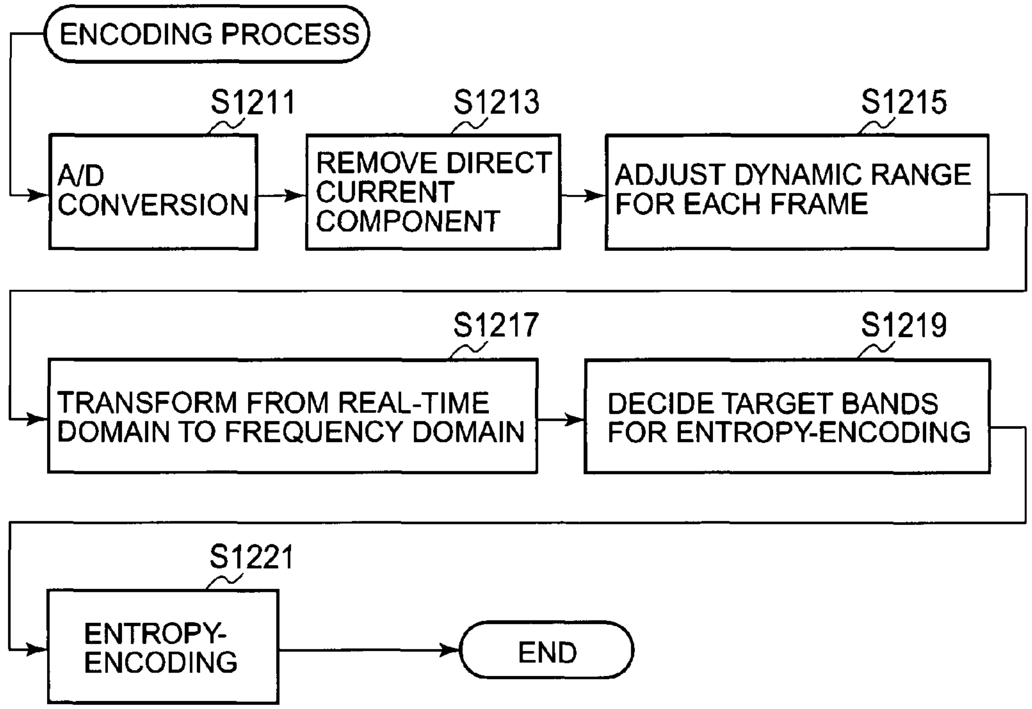
FIG. 12A shows audio signal process in the second embodiment.

FIG. 12A is a diagram summarizing the outline of the procedure for audio signal encoding process, in the case where the audio encoding/decoding device 9111 in accordance with the present embodiment functions as the sending device.

The audio processing unit 9141 A/D converts an audio signal collected by the microphone 9151 (step S1211), and removes the direct current component thereof (step S1213).

Next, the CPU 9121 adjusts the dynamic range for each of the frames (the parts of audio compression) (step S1215). In the case where the original dynamic range is larger than a predetermined limit value, division by a power of 2 of the signal values, i.e., a right bit-shift operation, is performed to reduce the data volume. The processing up to this point is in the real-time domain.

For each frame or MDCT block, the CPU 9121 conducts transformation to the frequency domain (step S1217). There are many techniques of discrete frequency transformation, but in the case of the present embodiment, the MDCT is adopted. In the same manner as the first embodiment, the CPU 9121 calculates re-quantized bit-shifted MDCT coefficients and shift bit numbers.

The CPU 9121 decides the encoding bands to be entropy encoded (step S1219). The CPU 9121 conducts entropy encoding (step S1221).

(Decoding Process)

Figure 12B:
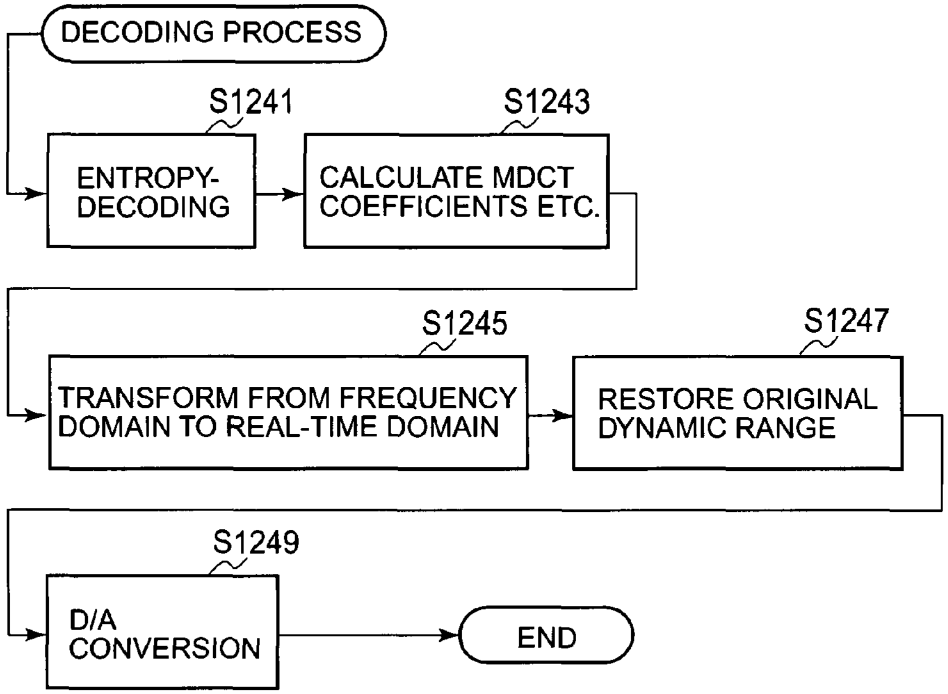
FIG. 12B shows audio signal decoding process.

The audio encoding/decoding device 9111, when functioning as a receiving device, follows the procedure shown in FIG. 12B. Essentially, this is the reverse of the procedure for encoding process in FIG. 12A.

The actual audio signal is a series of a plurality of frames. By executing in a continuous chain the various steps described above, it becomes possible to play back the audio in real-time. This technology in itself is already known and is not of the essence of the present invention; therefore, the process for 1 frame will be described herein.

Figure 13:
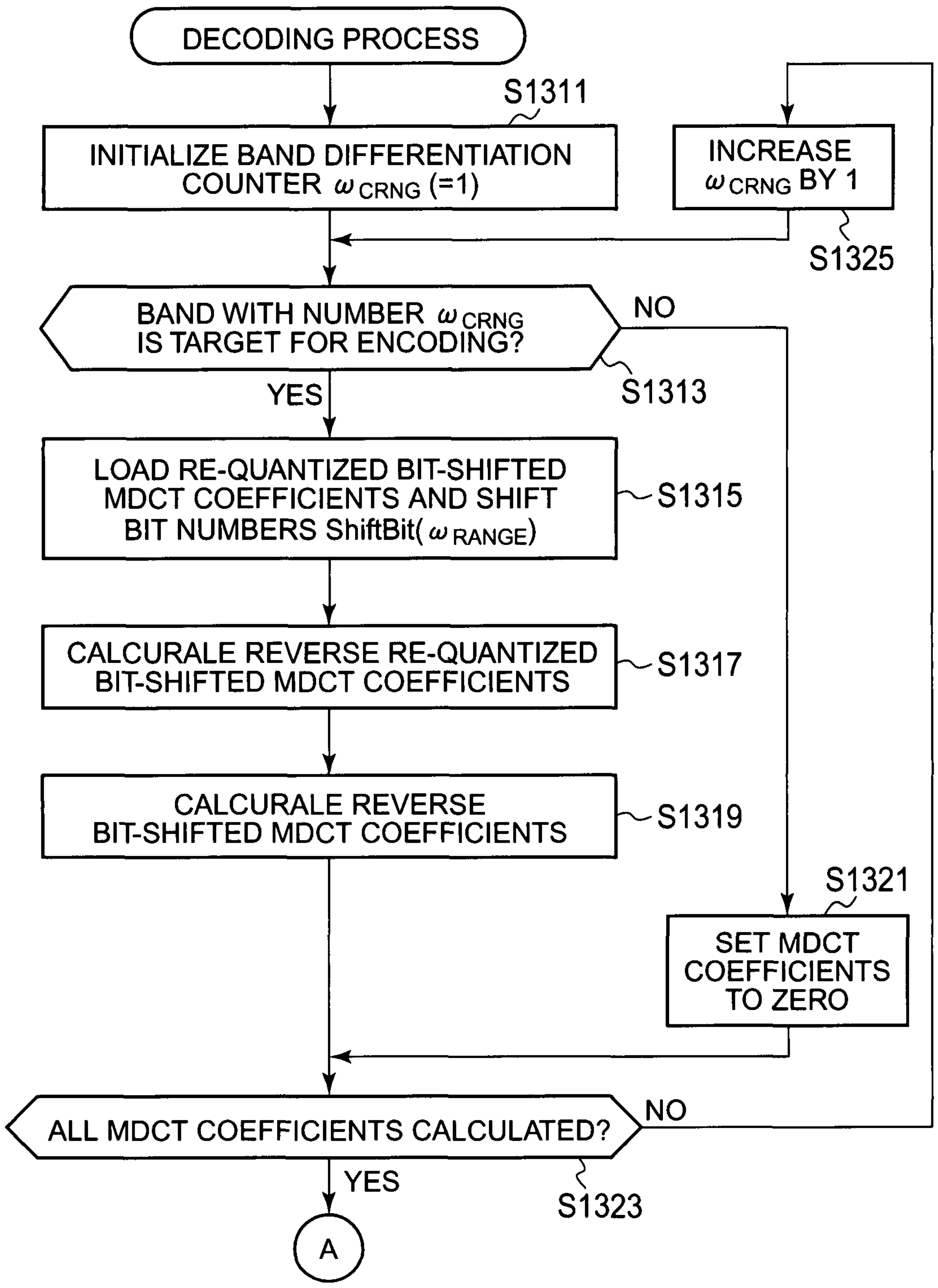
FIG. 13 is a flowchart showing audio signal decoding process in the second embodiment.
Figure 14:
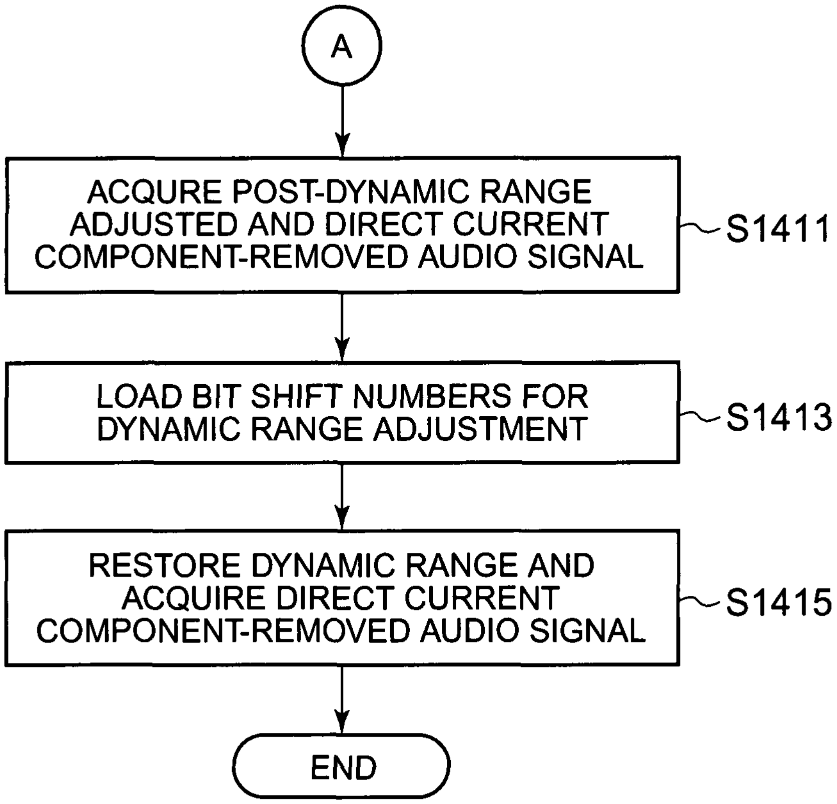
FIG. 14 is a flowchart (continued) showing decoding process in the second embodiment.

A more detailed procedure will be described later using FIGS. 13 and 14; first, an outline of decoding process will be described herein.

The wireless communication unit 9161 receives at the antenna 9163 a wireless electromagnetic wave sent from a sending device, and the CPU 9121 acquires entropy code data.

The CPU 9121 stores the acquired entropy code data in the storage unit 9125. The CPU 9121, following the program stored in the ROM 9123, decodes the entropy code data (step S1241). For entropy encoding methods, several are known, such as the Huffman code and RangeCoder, etc., but it will be realized that each forms a pair with a decoding method. Consequently, a decoding method that forms a pair with the entropy encoding formula used in the encoding and in the device 9111 on the sending side will be used. The CPU 9121 acquires the necessary data for audio restoration, such as MDCT coefficients and shift bit numbers (step S1243).

As described above, during the encoding of the audio spectra, bands that are inferred to have a high importance level are preferentially encoded. Consequently, it is not always the case that all portions of the spectra are transmitted to the receiving device. The CPU 9121 regards the bands among the audio spectra that were not transmitted, in other words, the MDCT coefficients of the bands that were not encoded by the sending device, as 0.

The CPU 9121 transforms the audio spectra from the frequency domain to the real-time domain (step S1245). A single spectrum is transformed into the real-time signal of a single MDCT block.

As described above, it is preferable for a frame (the part of audio compression) in the real-time domain to be comprised of approximately 3-4 MDCT blocks. However, for simplicity in understanding of the present invention, it is assumed that a single frame includes only a single MDCT block.

As a result of the dynamic range adjustment conducted by the sending device in step S1215, there is a possibility that the real-time domain audio signal acquired in step S1245 differs from the original audio signal. Thus, the CPU 9121 restores the dynamic range based on the shift bit numbers from the dynamic range adjustment process acquired in step S1243 (step S1247). At this time, since the dynamic range adjustment process is conducted by division limited to powers of 2 (right bit shift operations), the CPU 9121 only needs to perform right bit shift operations. Consequently, the processing of the CPU 9121 is sped up, and the processing load is lightened.

The audio processing unit 9141 D/A converts the acquired digital audio signal, converting it into an analog audio signal (step S1251). This analog audio signal is output by the speaker 9153, and the user of the receiving device can listen to the audio.

Next, the processing of steps S1243 to S1247 will be described in more detail, using the flowcharts shown in FIGS. 13 and 14.

In step S1241, the CPU 9121 entropy decodes, and stores in the storage unit 9125, the following data corresponding to a frame fm:

(1) Band numbers $\omega_{CRNG}(P)$ ($1=P=P_{MAX}$) corresponding to the 1st to $P_{MAX}$-th priorities, (2) Re-quantized bit-shifted MDCT coefficients $X_{QBS}(\omega_{CRNG}(P), 1), \ldots, X_{QBS}(\omega_{CRNG}(P), q(\omega_{CRNG}(P))$ ($1=P=P_{MAX}$), (3) Shift bit numbers ShiftBit($\omega_{RANGE}$) of all of the medium-segment bands $\omega_{RANGE}$ that overlap with the encoding bands corresponding to the 1st to $P_{MAX}$-th priorities, (4) Shift bit numbers ShiftBit(fm) from dynamic range adjustment.

The CPU 9121, following the program stored in the ROM 9123, stores a counter $\omega_{CRNG}$ for differentiating encoding bands in the counter register, and sets an initial value of 1 (step S1311). In other words, spectra are restored in succession from the low-frequency side.

Next, the CPU 9121 determines whether or not the encoding band with number $\omega_{CRNG}$ was targeted for encoding in the sending device (step S1313). Specifically, an encoding band that is targeted for encoding is assigned a priority P ($1=P=P_{MAX}$). Accordingly, the CPU 9121 makes determinations according to whether or not a priority was assigned to an individual encoding band.

Furthermore, the sending device may also send to the receiving device information indicating the band numbers for which it was decided to not encode, or information to the effect that some MDCT coefficients may be treated as 0.

In the case where it is determined that the encoding band with number $\omega_{CRNG}$ was not a target for encoding (step S1313; NO), the CPU 9121 sets the MDCT coefficients thereof to zero (step S1321):

$$X(\omega_{CRNG}, 1)=0, \ldots, X(\omega_{CRNG}, q(\omega_{CRNG}))=0$$

In other words, the spectral components of this band are regarded as 0.

The sending device preferentially encodes the portions from among the entire spectra inferred to be important and transmits them. A particular band not being targeted for encoding means that the importance level is relatively low for the spectra of that band. Furthermore, the spectral components of such a band may be set to a suitable set value other than zero, if doing such does not have a large effect on the bands with high priorities among the spectra.

On the other hand, in step S1313, in the case where it is determined that the encoding band with number $\omega_{CRNG}$ is targeted for encoding (step S1313; YES), the CPU 9121 loads (1) the re-quantized bit-shifted MDCT coefficients $X_{QBS}(\omega_{CRNG}, 1), \ldots, X_{QBS}(\omega_{CRNG, q(\omega CRNG)})$, and (2) the shift bit numbers ShiftBit($\omega_{RANGE}$) of all of the medium-segment bands overlapping the encoding band with number $\omega_{CRNG}$, into the general-purpose register (step S1315).

The CPU 9121 de-quantizes the re-quantized bit-shifted MDCT coefficients, solving for bit-shifted MDCT coefficients $X_{BS}(\omega_{CRNG}, 1), \ldots, X_{BS}(\omega_{CRNG}, q(\omega_{CRNG}))$ (step S1317).

The CPU 9121, based on the shift bit numbers loaded in step S1315, performs inverse bit shift conversion on the bit-shifted MDCT coefficients, solving for MDCT coefficients $X(\omega_{CRNG}, 1), \ldots, X(\omega_{CRNG}, q(\omega_{CRNG}))$ (step S1319). As the sending device performs right shift operations for the encoding process, by contrast the receiving device performs left shift operations in this step. In this way, since the divisor and multiplier are limited to powers of 2, a single division and multiplication can be performed with simply a single right shift and left shift, respectively, and thus encoding process and decoding process can be sped up.

The processing of step S1317 and step S1319 are generally equivalent to the processing of steps S9643 to S9651 of the first embodiment.

The CPU 9121 determines whether or not the MDCT coefficients for the entire frequency domain have been calculated (step S1323). In the case where it is determined that there are still bands with uncalculated MDCT coefficients (step S1323; NO), the value of $\omega_{CRNG}$ is increased by 1 to acquire the MDCT coefficients for the next (adjacent o the high-frequency side) encoding band (step S1325), and the process returns to step S1313. In the case where it is determined that the MDCT coefficients of all the bands have been calculated (step S1323; YES), the process proceeds to S1411 of FIG. 14.

Hereinafter, for the sake of brevity, the following subscripts will be substituted for numbers:

$X(1, 1)$: $X_0$.

. . . , $X(1, q(11))$: . . . ,

. . . , $X(\omega_{CRNGMAX}, q(\omega_{CRNGMAX}))$: $X_{M/2-1}$ $\omega_{CRNGMAX}$ is the maximum value of the encoding band band numbers; in other words, the umber appended to the highest encoding band on the high-frequency side.

Using the inverse MDCT, the CPU 9121 restores the dynamic-range-adjusted and direct-current-component-removed audio signal $x_{BS,AC}(fm,0), \ldots, s_{BS,AC}(fm,M-1)$ from the MDCT coefficients $X_0, \ldots, X_{M/2-1}$ (step S1411). In other words, the spectra are transformed from the frequency domain to the real-time domain. fm is a variable for differentiating frames.

As a result, a signal like that shown in FIG. 7C is restored.

The CPU 9121 loads from the storage unit 9125 the shift bit numbers ShiftBit(fm) for dynamic range adjustment (step S1413).

Next, the CPU 9121, by performing left shift operations of the amount ShiftBit(fm), restores the direct-current-component-removed input signal $x_{AC}(fm, 0), \ldots, x_{AC}(fm, M-1)$ (step S1415). In other words, the amplitudes changed due to dynamic range adjustment process are restored to the original amplitudes.

As a result, the signal is restored to one like that shown in FIG. 7B. The audio processing unit 9141 D/A converts the acquired digital signal (step S1251), and outputs the audio from the speaker 9153.

It should be appreciated that the present invention is not limited to the above-described embodiments, and various variants and applications are possible. It is to be understood that the hardware configuration, block configuration, and flowcharts in the foregoing, being illustrative examples, do not limit the present embodiments.

For example, although the audio encoding/decoding device 9111 was hypothetically described as a mobile phone, the present invention can be easily applied to PHS (Personal Handyphone Systems), PDA (Personal Digital Assistants), or typical personal computers.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments.

Various modifications made within the meaning of an equivalent of the claims of the invention and within the claims are to be regarded to be in the scope of the present invention.

This application is based on Japanese Patent Application No. 2006-270993 filed on Oct. 2, 2006 and including specification, claims, drawings and summary. The disclosure of the above Japanese Patent Application is incorporated herein by reference in its entirety.

What is claimed is:

1. An audio encoding device, comprising:

a storage unit which stores information indicating a frequency width of each of a plurality of bands of audio data comprised of a plurality of first frequency bands, in association with a set number of bits respectively, wherein the set number of bits increases with respect to a central frequency of at least one of the frequency widths on a lower-frequency side;

a discrete transformation unit that discretely transforms the audio data from a real-time domain to a frequency domain by acquiring the audio data and calculating quantized values indicating audio strength for each frequency;

a maximum value acquisition unit that separates the discretely transformed frequency domain audio data into the plurality of first frequency bands having the respective frequency widths, and acquires a maximum value of quantized values for each of the separated first frequency bands;

a determining unit that, for each of the first frequency bands, determines whether or not a number of bits necessary for expressing the corresponding maximum value acquired by the maximum value acquisition unit exceeds the corresponding set number of bits stored in the storage unit;

an adjustment unit that, for each of the first frequency bands, when the determining unit determines that the necessary number of bits exceeds the set number of bits, adjusts the audio strength by conducting a right shift operation of the quantized values so that the corresponding acquired maximum value is within the corresponding set number of bits;

a re-quantizing unit that, for each of a plurality of second frequency bands having a predetermined band width, re-quantizes quantized values calculated by the discrete transformation unit, or alternatively, quantized values adjusted by the adjustment unit, at a precision decided in advance such that the re-quantization precision increases with respect to at least one of the plurality of second frequency bands on the lower-frequency side; and an encoding unit that encodes and outputs quantized values calculated by the re-quantizing unit.

2. The audio encoding device according to claim 1, wherein the maximum value acquisition unit separates the audio data into the plurality of first frequency bands such that logarithms of every frequency width increase linearly in succession from a low-frequency side.

3. The audio encoding device according to claim 1, wherein the re-quantizing unit respectively calculates logarithms of the quantized values adjusted by the adjustment unit, and re-quantizes the logarithms.

4. The audio encoding device according to claim 1, wherein the re-quantizing unit separates and re-quantizes the audio data, the separation being into the plurality of second frequency bands having the predetermined band widths, and wherein logarithms of every band width increase linearly in succession from a low-frequency side.

5. The audio encoding device according to claim 1, wherein the re-quantizing unit separates the audio data into at least three second frequency bands, including a low-frequency band, a mid-frequency band, and a high-frequency band, and the separation is such that a boundary frequency between the mid-frequency band and the high-frequency band is half an upper limit frequency of the audio data.

6. The audio encoding device according to claim 1, wherein the encoding unit, for each of a plurality of third frequency bands comprised of one or more of the first frequency bands, calculates a total sum value of squared values of quantized values contained in the band, decides a priority in descending order from a largest calculated total sum, and entropy encodes the quantized values within the plurality of third frequency bands in descending order of the priority.

7. The audio encoding device according to claim 6, wherein the encoding unit calculates a value of each total sum value multiplied by a predetermined value that increases as the total sum value is on a low-frequency side.

8. The audio encoding device according to claim 1, wherein the discrete transformation unit calculates the quantized values by using Modified Discrete Cosine Transform.

9. The audio encoding device according to claim 1, wherein the adjustment unit adjusts the audio strength by solving for a divisor, and dividing each of the quantized values within the plurality of first frequency bands by the divisor, wherein the divisor is a value expressed as a power of 2 and is a smallest value among values in a case where the corresponding necessary number of bits does not exceed the corresponding set number of bits when the corresponding maximum value is divided by the divisor, and wherein the encoding unit encodes, associates, and outputs divisors calculated by the adjustment unit and the quantized values calculated by the re-quantizing unit.

10. An audio decoding device, comprising:

a receiving unit that receives encoded data generated by encoding data by a predetermined encoding method, the data including:

re-quantized audio data in which quantized audio data is re-quantized with a quantization precision that is predetermined for each of a plurality of second frequency bands, wherein a signal strength of the quantized audio data is expressed by quantized values adjusted for a predetermined each of a plurality of first frequency bands in audio data; and numerical parameters in which the signal strength is adjusted for each of the plurality of first frequency bands;

a decoding unit that, by using a decoding method corresponding to the predetermined encoding method, decodes the encoded data into the re-quantized data and the numerical parameters;

a restore unit that restores the decoded re-quantized data with the precision predetermined for each of the plurality of second frequency bands;

a strength restoration unit that, for each of the plurality of second frequency bands, multiplies decoded quantized values within the band by a decoded numerical parameter associated with that band, thereby restoring audio strength of the audio data; and a discrete inverse transformation unit that, for each of the plurality of first frequency bands, transforms the strength-restored audio data from a frequency domain to a time domain.

11. An audio encoding method executed in an audio encoding device having a storage unit which stores information indicating a frequency width of each of a plurality of bands of audio data comprised of a plurality of first frequency bands, in association with a set number of bits respectively, wherein the set number of bits increases with respect to a central frequency of at least one of the frequency widths on a lower-frequency side, the audio encoding method comprising:

acquiring the audio data and discretely transforming the audio data from a time domain to a frequency domain by calculating quantized values indicating audio strength for each frequency;

separating the discretely transformed frequency domain audio data into the plurality of first frequency bands having the respective frequency widths, and acquiring a maximum value of quantized values for each of the separated first frequency bands;

for each of the first frequency bands, determining whether or not a number of bits necessary for expressing the corresponding acquired maximum value exceeds the corresponding set number of bits stored in the storage unit;

for each of the first frequency bands, when it is determined that the necessary number of bits exceeds the set number of bits, adjusting the audio strength by conducting a right shift operation of the quantized values so that the corresponding acquired maximum value is within the corresponding set number of bits;

for each of a plurality of second frequency bands having a predetermined band width, re-quantizing quantized values calculated in the discrete transformation step, or alternatively, quantized values adjusted in the adjustment step, at a precision decided in advance such that the re-quantization precision increases with respect to at least one of the plurality of second frequency bands on the lower-frequency side; and encoding and outputting quantized values calculated in the re-quantizing step.

12. An audio decoding method comprising:

receiving encoded data generated by encoding data by a predetermined encoding method, the data including:

re-quantized audio data in which quantized audio data is re-quantized with a quantization precision that is predetermined for each of a plurality of second frequency bands, wherein a signal strength of the quantized audio data is expressed by quantized values adjusted for a predetermined each of a plurality of first frequency bands in audio data; and numerical parameters in which the signal strength is adjusted for each of the plurality of first frequency bands;

decoding the encoded data into the re-quantized data and the numerical parameters by using a decoding method corresponding to the predetermined encoding method;

restoring the decoded re-quantized data with the precision predetermined for each of the plurality of second frequency bands;

for each of the plurality of second frequency bands, restoring audio strength of the audio data by multiplying decoded quantized values within the band by a decoded numerical parameter associated with that band; and for each of the plurality of first frequency bands, discretely inverse transforming the strength-restored audio data from a frequency domain to a time domain.

* * * * *